(12) United States Patent
Hirai et al.

(10) Patent No.: US 11,655,126 B2
(45) Date of Patent: May 23, 2023

(54) DIAGNOSTIC SYSTEM

(71) Applicant: TOSHIBA ELEVATOR KABUSHIKI KAISHA, Kawasaki (JP)

(72) Inventors: Masaaki Hirai, Tokyo (JP); Tadashi Shudo, Tokyo (JP); Motoki Yoshida, Himeji Hyogo (JP); Yoshinobu Ishikawa, Tokyo (JP)

(73) Assignee: TOSHIBA ELEVATOR KABUSHIKI KAISHA, Kawasaki (JP)

( * ) Notice: Subject to any disclaimer, the term of this patent is extended or adjusted under 35 U.S.C. 154(b) by 0 days.

(21) Appl. No.: 17/528,349

(22) Filed: Nov. 17, 2021

(65) Prior Publication Data

US 2022/0153555 A1    May 19, 2022

(30) Foreign Application Priority Data

Nov. 19, 2020  (JP) .............................. JP2020-192562

(51) Int. Cl.
  *B66B 27/00*   (2006.01)
  *G01D 5/34*   (2006.01)
  *B65G 23/44*   (2006.01)

(52) U.S. Cl.
  CPC .............. *B66B 27/00* (2013.01); *B65G 23/44* (2013.01); *G01D 5/34* (2013.01)

(58) Field of Classification Search
  CPC .......... B65G 23/44; G01D 5/34; B66B 27/00; B66B 23/024
  USPC ................................... 198/329, 810.04, 813
  See application file for complete search history.

(56) References Cited

U.S. PATENT DOCUMENTS

| | | | | |
|---|---|---|---|---|
| 5,997,423 A | * | 12/1999 | Kwon | .................... B65G 23/44 198/810.04 |
| 7,540,374 B2 | * | 6/2009 | Rathbun | ................ B65G 43/02 198/810.04 |
| 8,285,494 B2 | * | 10/2012 | Vozner | ................. G01B 11/043 198/810.04 |
| 8,550,236 B2 | * | 10/2013 | Merten | .................. B65G 23/44 198/810.04 |

FOREIGN PATENT DOCUMENTS

| | | | | |
|---|---|---|---|---|
| EP | 1464919 | * | 10/2004 | ............... G01B 7/02 |
| JP | 2008-189450 A | | 8/2008 | |
| JP | 2017-019616 A | | 1/2017 | |
| JP | 6170220 B1 | | 7/2017 | |
| JP | 2018-039636 A | | 3/2018 | |
| JP | 6505890 B1 | | 4/2019 | |
| JP | 2019-156568 A | | 9/2019 | |

* cited by examiner

*Primary Examiner* — James R Bidwell
(74) *Attorney, Agent, or Firm* — Foley & Lardner LLP

(57) ABSTRACT

According to one embodiment, a diagnostic system includes a conveyor device first and second sensors and a diagnostic device. The conveyor device includes an endless chain having a plurality of rollers coupled at regular pitches and each fit into a bush, to circularly move between a first sprocket and a second sprocket. The first and second sensors diagonally are disposed apart from each other on a moving path of the chain, irrespective of an operating direction of the conveyor device, to detect a passage of each of the rollers of the chain. The diagnostic device measures an amount of elongation of the chain based on a first detection signal output from the first sensor and a second detection signal output from the second sensor according to movement of the chain during operation of the conveyor device.

11 Claims, 18 Drawing Sheets

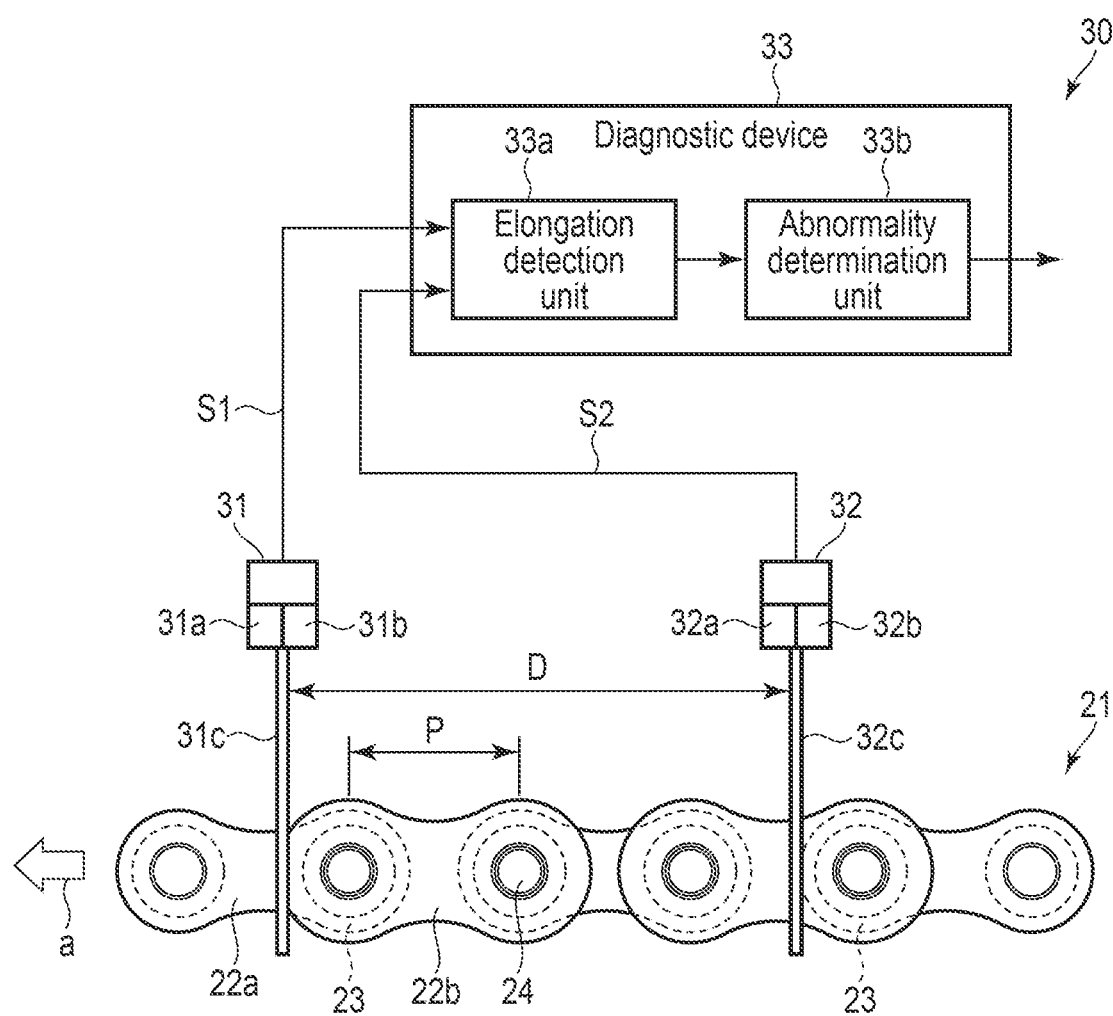
F I G. 3A
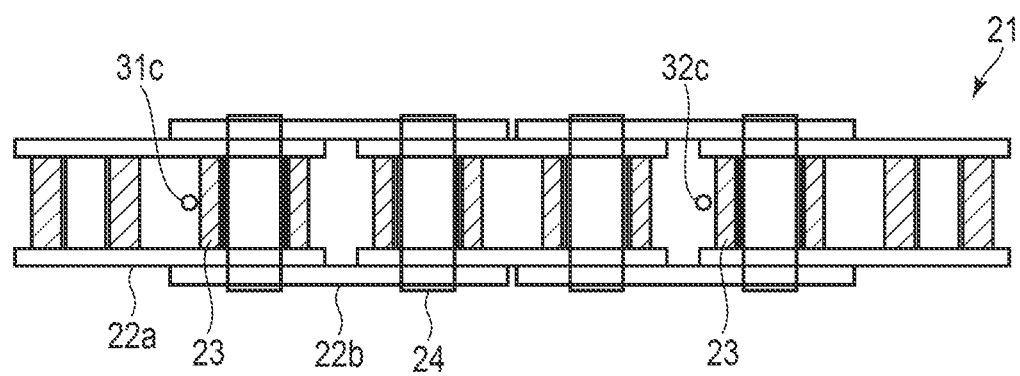
F I G. 3B

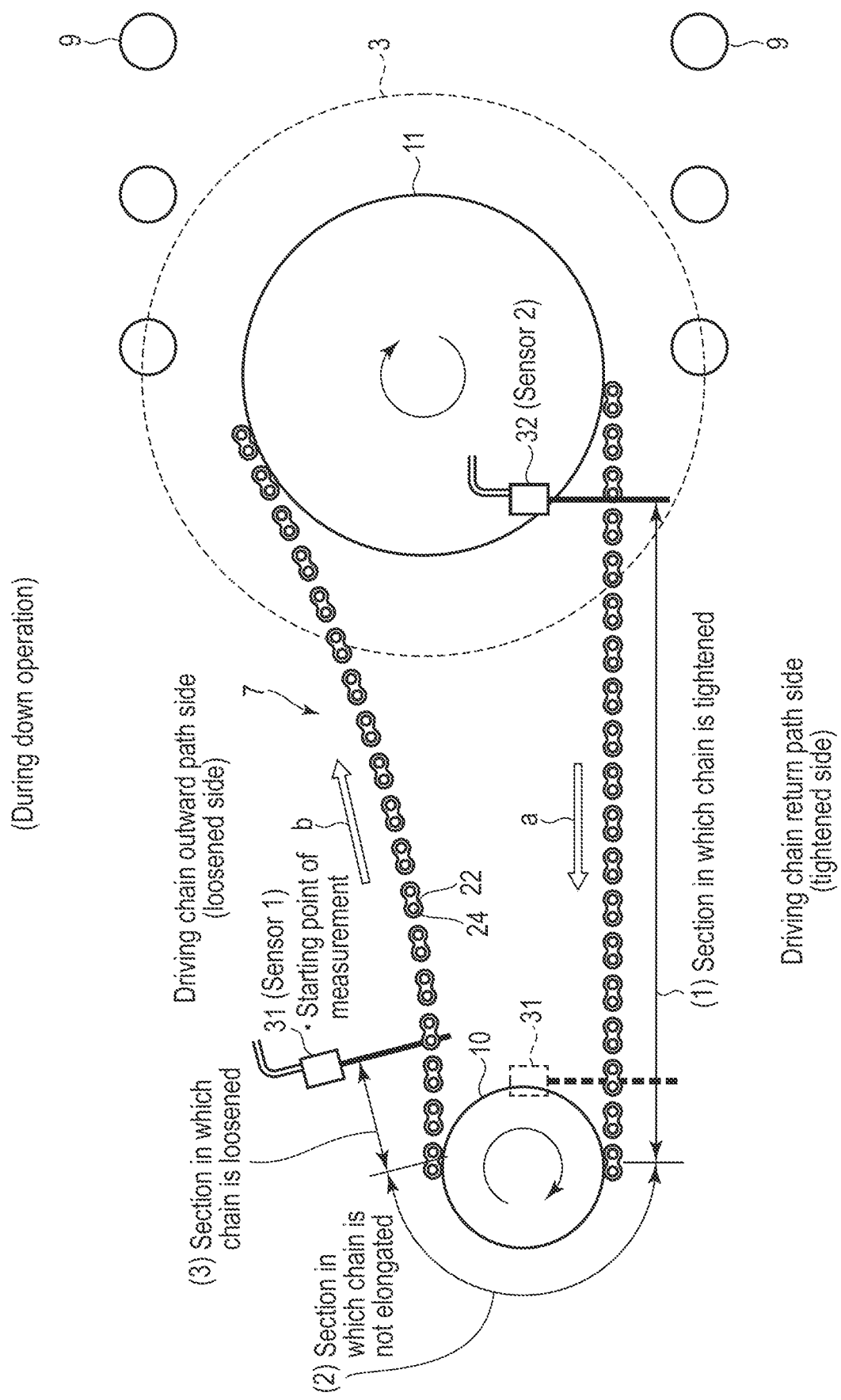
F I G. 11

DIAGNOSTIC SYSTEM

CROSS-REFERENCE TO RELATED APPLICATIONS

This application is based upon and claims the benefit of priority from Japanese Patent Application No. 2020-192562, filed Nov. 19, 2020, the entire contents of which are incorporated herein by reference.

FIELD

Embodiments described herein relate generally to a diagnostic system for use in conveyor devices such as escalators and moving walkways.

BACKGROUND

Escalators generally include three types of chain of a driving chain, a handrail chain and a step chain. These chains are extended because their connecting portions of adjacent links are slid and worn gradually as time passes.

More specifically, the distance between the roller of one link and the roller of another link that is separated from the former link increases. When the distance exceeds a predetermined amount, a sprocket is not engaged well with the chains and its teeth are worn out, with the result that the chains slides over the sprocket teeth (tooth skipping phenomenon). In that case, the steps of the escalators on which the passengers stand will fall down to the lower floor, which will lead to an accident in which the passengers fall down. To prevent this, the chains need to be replaced with new ones.

During the periodic inspection of the escalators, maintenance personnel measure the elongation of the chains and replace them with new ones when the elongation reaches a predetermined amount. However, the measurement of the elongation involves the operations of removing the step and opening the machine room. For this reason, the burden on the maintenance personnel is large, and the measurement cannot be performed during normal operation, which causes problems such as inability to respond to sudden abnormalities occurring during operation.

In order to solve the above problems, the following technology can be considered. Two photoelectric sensors are arranged along the moving direction of a chain to detect a shift in timing when two rollers whose chains are separated pass both the sensors and measure the amount of elongation between the two rollers automatically from the shift in timing.

However, the chain has a tightened portion to which tension is applied and a loosened portion to which no tension is applied and the chain. If a photoelectric sensor is disposed in the tightened portion, the elongation amount of the chain can be measured correctly, but if it is disposed in the loosened portion, the elongation amount cannot be measured correctly due to the looseness.

In order to measure the elongation amount of the chain accurately, the two photoelectric sensors need to be arranged on the moving path of the chain and alongside the tightened portion of the chain. In the driving chain, for example, the outward path side of the moving path (upper side) of the chain is tightened in the up operation, and the return path side of the moving path (lower side) of the chain is tightened in the down operation. It is thus necessary to place a photoelectric sensor on the outward path side in an escalator operated up and to place a photoelectric sensor on the return path side in an escalator operated down.

Therefore, the placement of the photoelectric sensors has to be changed in accordance with the operation direction of the escalator, which complicates the installation of the escalator. It is also necessary to prepare two types of fixing member for fixing the sensors to the escalator, one type for the outward path side and the other type for the return path side.

In addition, the operation direction of the escalator can freely be changed by escalator owner's convenience. Assume here that an escalator performs an up operation when it is initially installed and the photoelectric sensor also performs an up operation. If, in this case, the escalator actually performs a down operation, the elongation amount of the loosened part of the chain is measured, and therefore, the measurement is not correct. In order to avoid this situation, four photoelectric sensors have only to be prepared in advance, and two of them are provided on the outward path side of the moving path of the chain and the other two are provided on the return path side thereof; however, the number of components increases.

BRIEF DESCRIPTION OF THE DRAWINGS

FIG. 3A is a block diagram showing a configuration of a diagnostic system for diagnosing an elongation state of the chain, and is a side view of the chain.

FIG. 3B is a top view of the chain.

FIG. 11 is an illustration of a method for measuring the elongation of a chain in the second embodiment, showing a state of the driving chain during down operation.

DETAILED DESCRIPTION

Figure 1:
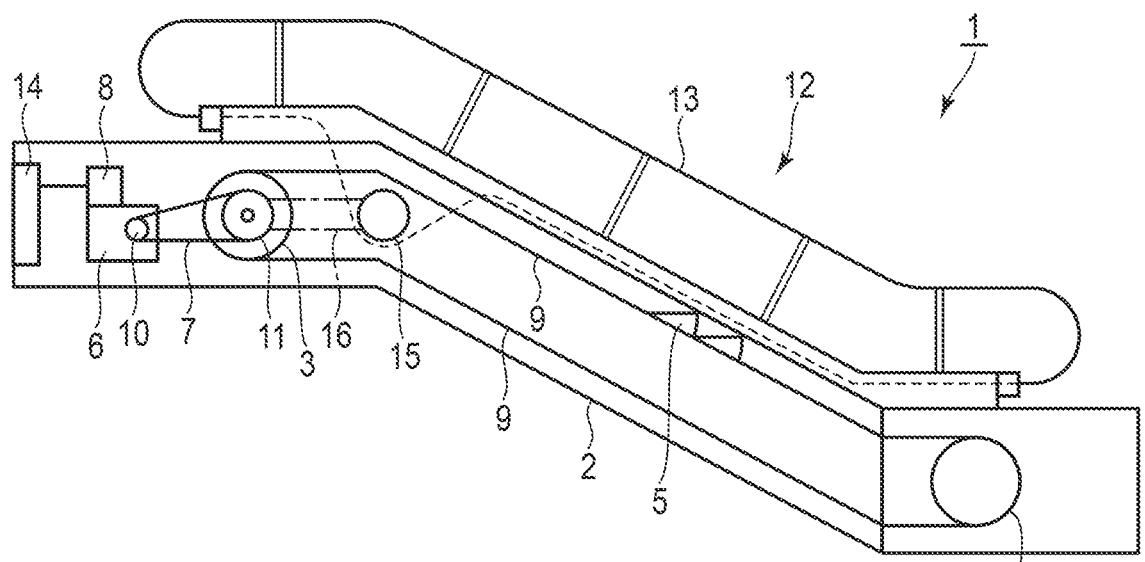
FIG. 1 is a schematic diagram showing a configuration of an escalator according to an embodiment.

In general, according to one embodiment, a diagnostic system includes a conveyor device first and second sensors and a diagnostic device. The conveyor device includes an endless chain having a plurality of rollers coupled at regular pitches and each fit into a bush, to circularly move between a first sprocket and a second sprocket. The first and second sensors diagonally are disposed apart from each other on a moving path of the chain, irrespective of an operating direction of the conveyor device, to detect a passage of each of the rollers of the chain. The diagnostic device measures an amount of elongation of the chain based on a first detection signal output from the first sensor and a second detection signal output from the second sensor according to movement of the chain during operation of the conveyor device.

Embodiments will be described below with reference to the drawings.

The disclosure of the embodiments is nothing but one example, and the invention is not limited by the descriptions of the embodiments. Modifications that could easily be conceived by a person with ordinary skill in the art are included in the scope of the disclosure. To clarify the descriptions, the drawings may show, for example, the size and shape of each component more schematically than those in the actual aspect. Elements corresponding to each other in the drawings are denoted by the same reference numeral and their detailed descriptions may be omitted.

FIG. 1 is a schematic diagram showing a configuration of an escalator according to an embodiment. In FIG. 1, reference numeral 1 denotes the entirety of an escalator that is one of the conveyor devices.

The escalator 1 circulates and moves a plurality of endlessly connected steps 5 by driving a step chain 9 wound between a driving sprocket 3 and a driven sprocket 4. Specifically, the escalator 1 includes a plurality of steps 5 inside a truss (structural frame) 2.

The driving sprocket 3 and driven sprocket 4 are arranged on the upper and lower floors in the truss 2. A reducer 6 is provided close to the driving sprocket 3, a driving sprocket 10 is provided on the rotary shaft of the reducer 6, and a driven sprocket 11 is provided coaxially with the driving sprocket 3. An endless driving chain 7 is wound between the driving sprocket 10 and the driven sprocket 11.

The rotational power of a motor 8 is transmitted to the driving sprocket 3 through the driving chain 7 wound around the driven sprocket 11. An endless step chain 9 is wound between the driving sprocket 3 and the driven sprocket 4. When the driving sprocket 3 is rotated upon receiving the rotational power of the motor 8, the steps 5, which are connected to the step chain 9, are circularly moved.

In addition, paired handrails 12 are each provided on either side of the steps 5 of the escalator 1 in their moving direction, and an endless handrail belt 13 is attached along the outer periphery of the handrails 12. Inside the truss 2, a handrail driving sprocket 15 is spaced from the driven sprocket 11 at a fixed interval.

An endless handrail chain 16 is wound between the handrail driving sprocket 15 and the driven sprocket 11. When the driving sprocket 3 is rotated upon receipt of the rotational power of the motor 8, the handrail driving sprocket 15 is rotated through the handrail chain 16 wound around the driven sprocket 11. As the handrail driving sprocket 15 rotates, the handrail belt 13 circularly moves in the same direction as the steps 5 in accordance with the movement of the steps 5.

The operation of the escalator 1 is controlled by a control device 14 placed in the truss 2. As an example, the control device 14 includes an inverter device (not shown) that drives the motor 8 and a microcomputer that controls the inverter device to controls the inverter device and the motor 8. The microcomputer includes a CPU, a RAM, a ROM and the like (neither of which is shown), loads an application program into the RAM from the ROM and causes the CPU to execute the program, thereby operating various devices constituting the escalator 1. The CPU also reads and writes various types of data from and to the RAM and ROM.

The driving chain 7 and the handrail chain 16 are generally-used roller chains. These chains will be referred to as a chain 21 (see FIG. 2), and a configuration of a diagnostic system for diagnosing an elongation state of the chain 21 will be described. As an example of the step chain 9, a conveyor chain is used. In the present embodiment, the step chain 9 is applied to a roller chain, but it can be applied to the conveyor chain as well.

Figure 2:
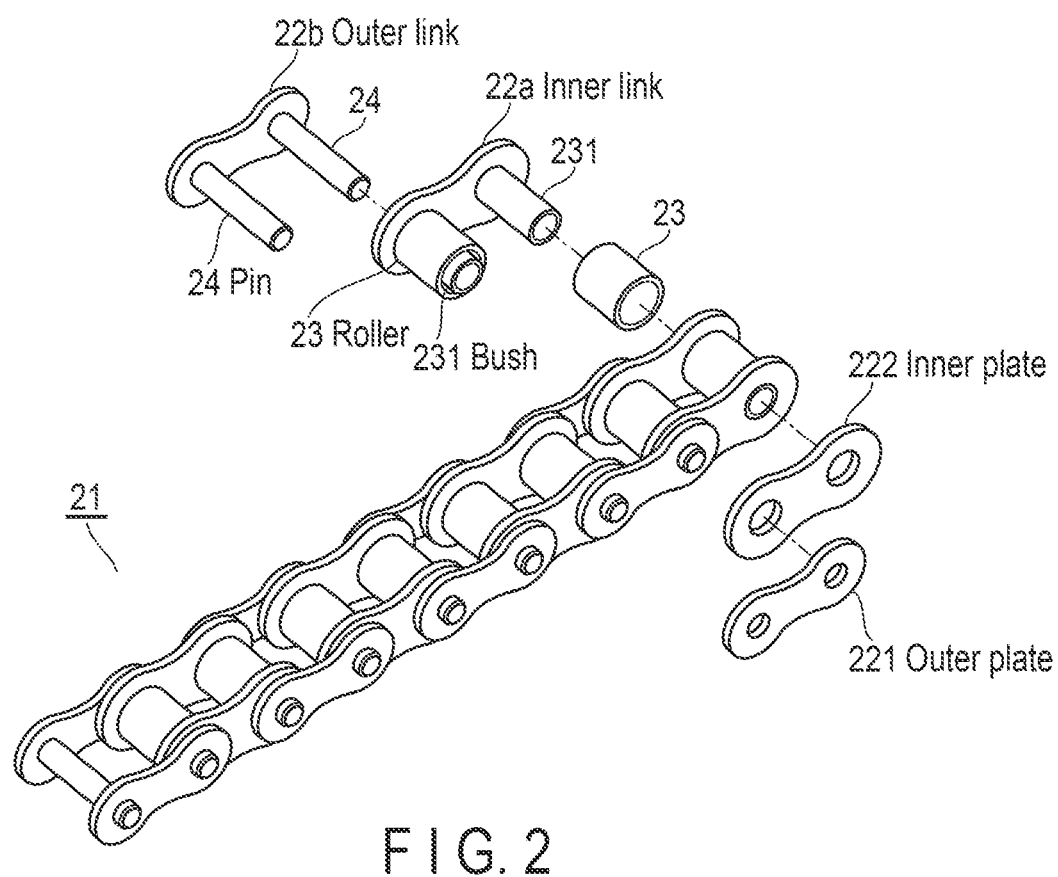
FIG. 2 is a perspective view showing a configuration of a chain for use in the escalator.

FIG. 2 is a perspective view showing a configuration of the chain 21 (roller chain) used as the driving chain 7 and the handrail chain 16.

The chain 21 includes a plurality of inner links 22a including a pair of bushes 22 and an inner plate 222, and a plurality of outer links 22b including a pair of pins 24 and an outer plate 221, which are alternately and continuously connected endlessly. The pins 24 of the outer link 22b are slidably fit into the bushes 231 of the inner link 22a, and a roller 23 is slidably engaged with the outer peripheries of the bushes 231. A photoelectric sensor to be described later is used to detect the passage of the roller 23 optically.

The chain 21 is elongated by the following phenomenon. With the operation time of the escalator 1, the outer periphery of each of the pins 24 of the outer link 22b is shaved by sliding, and the diameter of each pin 24 decreases. As the diameter decreases, a difference is caused between the inner diameter of each bush 231 of the inner link 22a, which is manufactured with the same diameter as each pin 24 of the outer link 22b, and the outer diameter of each pin 24, and a gap is formed between them. If, therefore, tension is applied to the chain 21, the pins 24 of the outer link 22b move to the outside of the bushes 231 of the inner link 22a by the gap, and an interval between the rollers 23 provided on the links 22a and 22b increases. Accordingly, each of the links of the chain 21 is elongated.

Since all the links 22a and 22b slide the same number of times, the amounts of elongation of the links are approximately equal. In the present embodiment, the total elongation of a plurality of links included between the two photoelectric sensors is detected.

FIG. 3A is a block diagram showing a configuration of a diagnostic system, and is a side view of the chain. FIG. 3B is a top view of the chain.

As shown in FIG. 3A, the diagnostic system 30 includes the chain 21, two sensors 31 and 32 disposed above or below the chain 21 in its longitudinal direction, and a diagnostic device 33 connected to the sensors 31 and 32.

The sensors 31 and 32 are arranged at a predetermined interval D in the moving direction of the chain 21 (direction of arrow a). The "predetermined interval D" is a length that is an integral multiple of a chain pitch P. In the example of FIG. 3A, the interval is three times the chain pitch P (that is, the distance of three links) because of space limitations to the drawing, but actually it is not limited to the three links.

The sensors 31 and 32 are, for example, diffuse reflection type photoelectric sensors. The sensor 31 has a structure in which light projectors 31a and 32a are formed integrally as one unit, and the sensor 32 has a structure in which light receivers 31b and 32b are formed integrally as one unit. As shown in FIG. 3B, the sensor 31 detects the passing of the roller 23 from the quantity of light output from the light projector 31a, reflected by the roller 23 and received by the light receiver 31b. In FIG. 3B, 31c denotes light emitted from the sensor 31. Similarly, the sensor 32 detects the passing of the roller 23 from the quantity of light output from the light projector 32a, reflected by the roller 23 and received by the light receiver 32b. In FIG. 3B, 32c denotes light emitted from the sensor 32.

The diagnostic device 33 is provided in the truss 2 as a device independent of the control device 14. The diagnostic device 33 is formed of, for example, a microcomputer, and starts a predetermined program to fulfill the function of the diagnostic system. Note that the control device 14 may have a function achieved by the diagnostic device 33.

The diagnostic device 33 includes an elongation detection unit 33a and an abnormality determination unit 33b as a functional unit for achieving the diagnostic system. As the chain 21 moves, the elongation detection unit 33a detects an amount of elongation of the chain 21 based on the rise timing of a detection signal S1 output from the sensor 31 and the rise timing of a detection signal S2 output from the sensor 32. When the amount of elongation of the chain 21 detected by the elongation detection unit 33a is equal to or greater than a preset reference value, the abnormality determination unit 33b determines that it is abnormal and notifies the control device 14 of the abnormality. Upon receiving abnormality notification from the abnormality determination unit 33b, the control device 14, for example, turns on an alarm lamp (not shown) and issues abnormality to a monitoring room of a building where the escalator 1 is installed and to an external monitoring center to request them to inspect the escalator 1.

Figure 4:
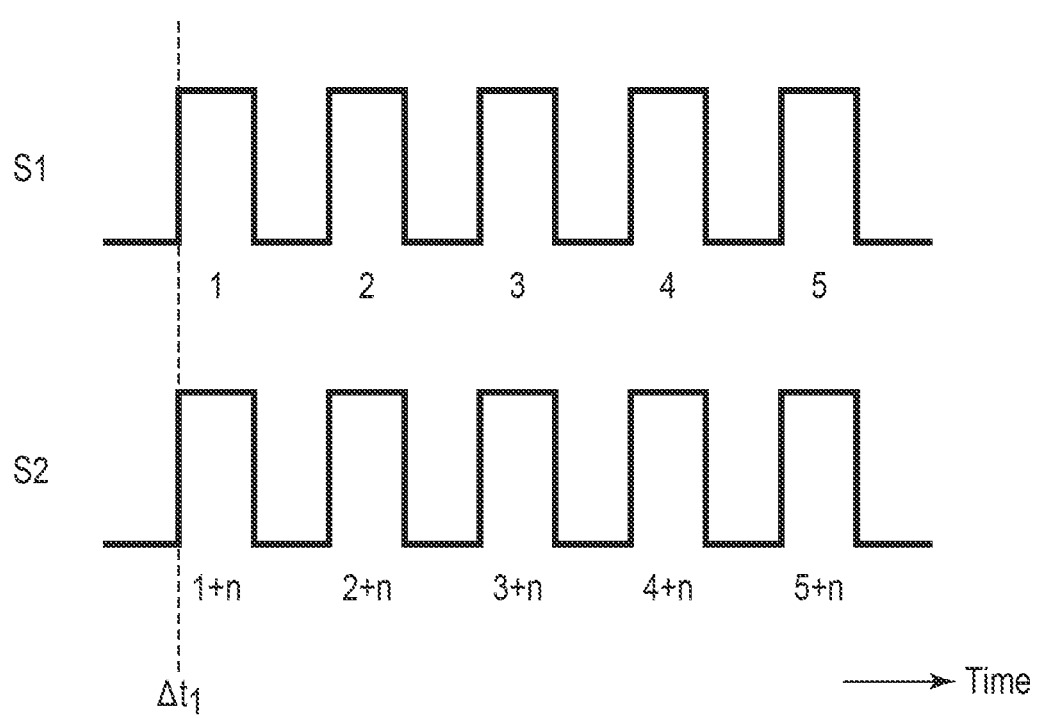
FIG. 4 is a chart showing the state of detection signals of two sensors when the chain is not elongated.
Figure 5:
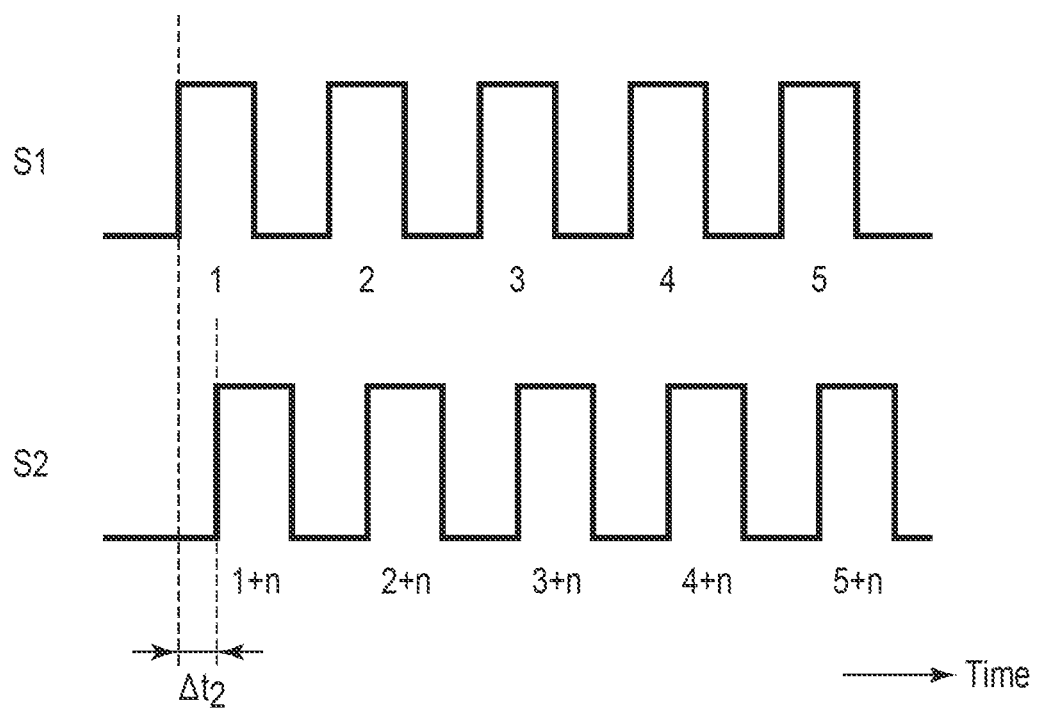
FIG. 5 is a chart showing the state of detection signals of two sensors when the chain is elongated.

A method for measuring an amount of elongation of the chain 21 will be described with reference to FIGS. 4 and 5. FIG. 4 shows the state of the detection signals S1 and S2 of the sensors 31 and 32 when the chain 21 is not elongated. FIG. 5 shows the state of the detection signals S1 and S2 of the sensors 31 and 32 when the chain 21 is elongated.

Assume that the chain 21 moves in the direction of arrow in FIG. 2. The sensors 31 and 32 detect passage of the rollers 23 of the chain 21 at their respective positions and output the detection signals S1 and S2. A time difference between the detection signals S1 and S2 is detected with timing when each of the detection signals S1 and S2 rises first.

Assume in the above case that, for example, the number of the rollers 23 is set to "1" when the detection signal S1 rises first and the numbers are added to each of the rollers 23 in ascending order. On the sensor 31 side, the detection signal S1 is output each time the passage of the rollers 23 of "1", "2", "3", . . . is detected. On the other hand, the sensor 32 is provided behind the sensor 31 by a predetermined number n of links, and thus the number of the roller is "1+n" when the detection signal S2 rises first. On the sensor 32 side, the detection signal S2 is output each time the passage of the rollers 23 of "1+n", "2+n", "3+n", . . . is detected. In the example of FIG. 3A, the sensor 32 is provided three links behind the sensor 31, thus, "n"="3".

As shown in FIG. 4, when the chain 21 is not elongated, the rise of the detection signal S1 of the sensor 31 and that of the detection signal S2 of the sensor 32 are the same, and a time difference $\Delta t1$ between them is almost zero. On the other hand, as shown in FIG. 5, when the chain 21 is elongated, the timing with which the rollers 23 pass the sensor 31 does not coincide with the timing with which the rollers 23 provided n links behind pass the sensor 32. Thus, a time difference $\Delta t2$ occurs between the rise of the detection signal S1 of the sensor 31 and that of the detection signal S2 of the sensor 32. Therefore, the elongation amount of the chain 21 can be obtained from $\Delta t2$.

In order to measure the elongation amount of the chain 21 accurately, the two sensors 31 and 32 need to be arranged on the side of the moving path where the chain 21 is tightened. Usually, during the up operation, the tension of the driving sprocket acts on the outward path side of the moving path of the chain 21 (the upper chain), with the result that the chain on the outward path side is tightened and the chain on the return path side (the lower chain) is loosened. On the other hand, during the down operation, the tension of the driving sprocket acts on the return side of the moving path of the chain 21 (the lower chain), with the result that the chain on the return side is tightened and the chain on the outward side (the upper chain) is loosened.

In general, therefore, in accordance with the operation direction of the escalator 1, the arrangement of the two sensors 31 and 32 has be changed to the outward path side or return path side of the moving path, or the two sensors 31 and 32 have to be arranged on either of the outward path side and the return path side, respectively. However, the change in the arrangement of the two sensors 31 and 32 complicates the installation work, and the arrangement of the two sensors 31 and 32 on either of the outward route side and the return route side increases the number of components and causes problems in the installation space and the costs.

Hereinafter, taking the driving chain 7 as an example, a method for measuring the elongation of the chain with high accuracy without changing the sensor arrangement during the up operation and the down operation, will be described in detail for each of the embodiments.

In the escalator 1 shown in FIG. 1, the driving chain 7 and the handrail chain 16 have a similar mechanism, and are likely to be loosened toward the outward path side or the return path side of the moving path according to the operation direction of the escalator 1.

First Embodiment

Figure 6:
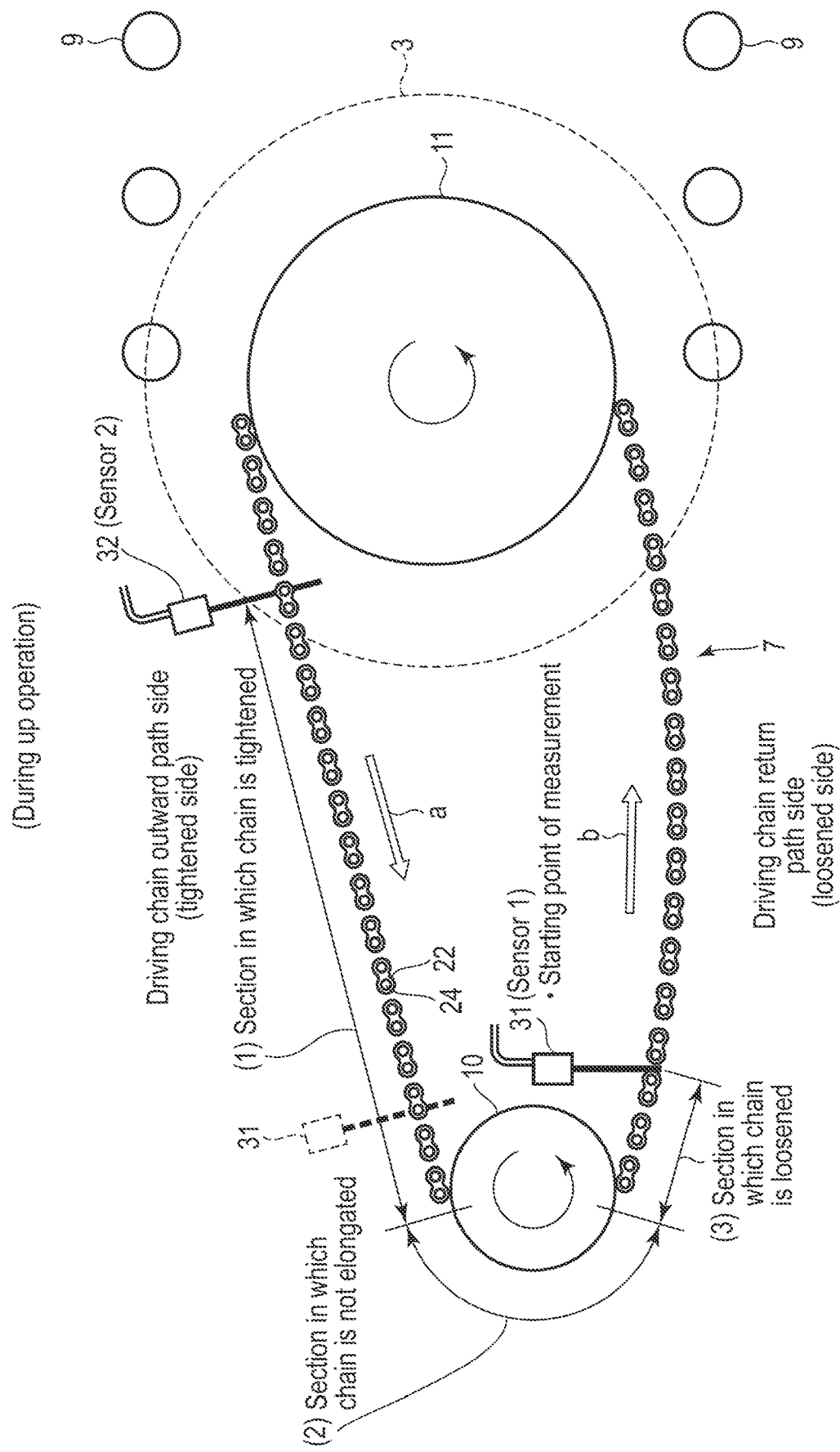
FIG. 6 is an illustration of a method for measuring the elongation of a chain in a first embodiment, showing a state of a driving chain during up operation.
Figure 7:
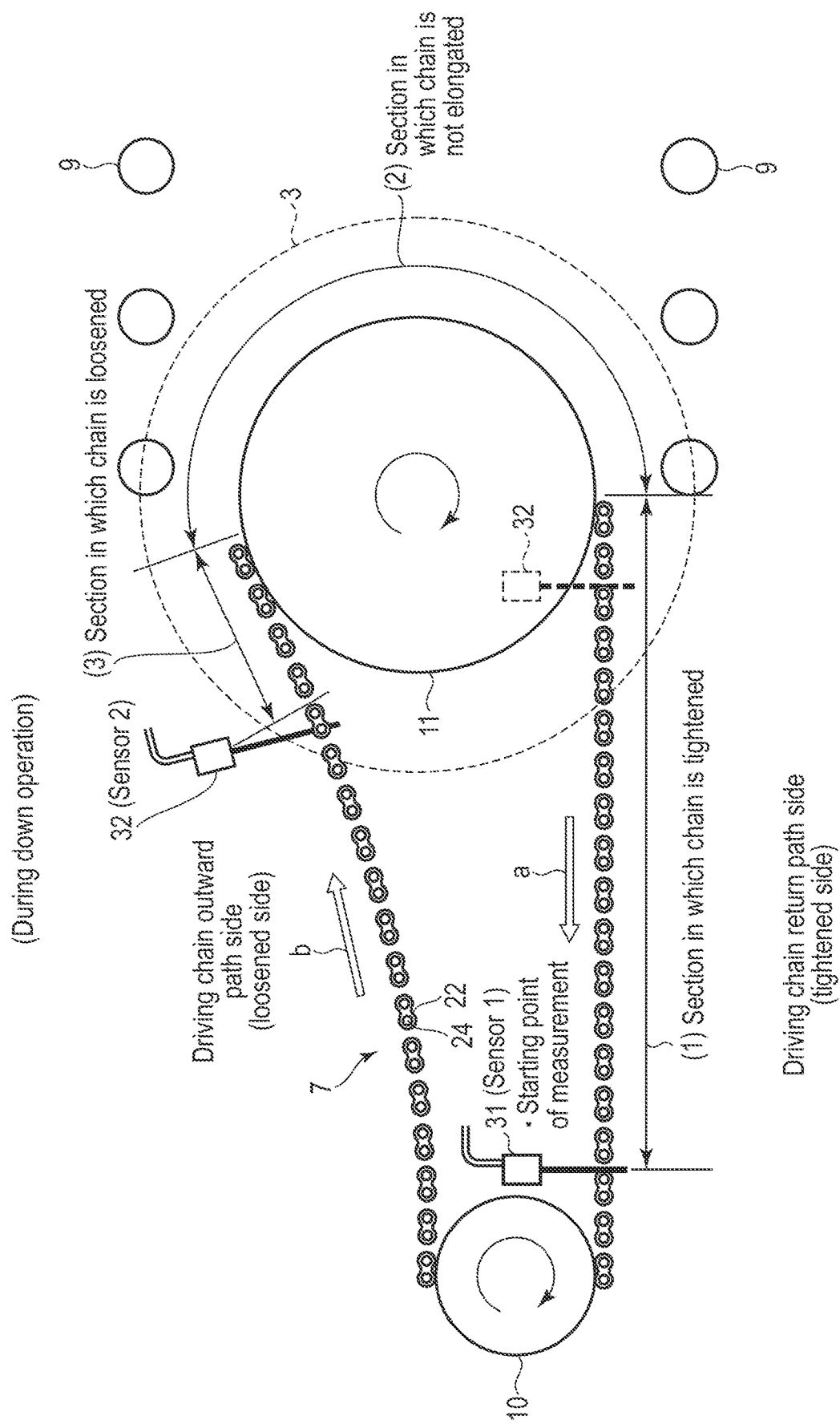
FIG. 7 is an illustration of a method for measuring the elongation of a chain in the first embodiment, showing a state of the driving chain during down operation.

FIGS. 6 and 7 are each an illustration of a method for measuring the elongation of a chain in a first embodiment, and are enlarged views of portions of the driving sprocket 10, driving chain 7 and driven sprocket 11 on the upper floor side in FIG. 1. FIG. 6 shows a state of the driving chain during the up operation, and FIG. 7 shows a state of the driving chain during the down operation. In the figures, the sensor 31 means a first sensor and is represented as "sensor 1" and the sensor 32 means a second sensor and is represented as "sensor 2". The same applies to other figures. The configuration of the driving chain 7 is shown in a simplified manner. In FIGS. 6 and 7, reference numeral 22 indicates the inner links 22a and outer links 22b. The same applies to other figures.

The driving chain 7 is annularly run between the driving sprocket 10 and the driven sprocket 11, and circularly moved by the rotational force of the driving sprocket 10. Assume that the driving chain 7 is relatively elongated and loosened toward one side of the moving path. During the up operation, as shown in FIG. 6, the outward path side of the moving path of the driving chain 7 (the upper chain) moves in the direction of the arrow a, and the return path side thereof (the lower chain) moves in the direction of the arrow b. At this time, the outward path side is tightened by the action of tension of the driving sprocket 10, but the return path side is loosened because it receives no tension.

During the down operation, as shown in FIG. 7, the outward path side of the moving path of the driving chain 7 (the upper chain) moves in the direction of the arrow b, and the return path side thereof (the lower chain) moves in the direction of the arrow a. At this time, the return path side is tightened by the action of tension of the driving sprocket 10, but the outward path side is loosened because it receives no tension.

In the first embodiment, one of the two sensors 31 and 32 is disposed on the outward path side of the moving path of the driving chain 7, and the other sensor is disposed on the return path side of the moving path. In this case, it is preferable that the sensors 31 and 32 are diagonally disposed apart from each other on the outward path side and the return path side, one of the sensors is disposed near the driving sprocket 10, and the other sensor is disposed near the driven sprocket 11.

More specifically, as shown in FIGS. 6 and 7, the sensor 31 is disposed close to the driving sprocket 10 on the return path side of the moving path, and the sensor 32 is disposed close to the driven sprocket 11 on the outward path side of the moving path. The sensor 31 is used as a starting point of measurement as a first sensor to optically detect the passage of each of the rollers 23 provided on the driving chain 7 at regular pitches. The sensor 32 is used as a second sensor to optically detect the passage of each of the rollers 23 at a predetermined number of links behind the sensor 31.

Note that the sensors 31 and 32 indicated by dotted lines in FIGS. 6 and 7 are for reference only to show their conventional arrangement and do not actually exist. The same applies to other drawings.

In the sensor arrangement of the first embodiment, when the elongation of the driving chain 7 is measured during the up and down operations of the escalator 1, the elongation is as follows.

(During Up Operation)

As shown in FIG. 6, during the up operation, the outward path side of the driving chain 7 (the upper chain) is tightened and the return path side (the lower chain) is loosened. The sensors 31 and 32 are connected to the diagnostic device 33 shown in FIG. 3A. The elongation detection unit 33a of the diagnostic device 33 detects an elongation amount of the driving chain 7 in a measurement section from the sensor 31 to the sensor 32 with the sensor 31 as a starting point of measurement. More specifically, as the chain 21 moves, the elongation detection unit 33a determines a time difference between the rise timing of the detection signal S1 output from the sensor 31 and the rise timing of the detection signal S2 output from the sensor 32 and detects an elongation amount of the chain 21 based on the time difference.

The measurement section in the above case is the sum of a section (1) in which the driving chain 7 is tightened between the driving sprocket 10 on the outward path side and the driven sprocket 11, a section (2) in which the driving chain 7 is engaged with the driving sprocket 10 and is not elongated, and a section (3) in which the driving chain 7 is loosened near the driving sprocket 10 on the return path side.

The section (1) is a section in which the elongation of the driving chain 7 can accurately be measured. The section (2) is a section that is not related to the measurement. The section (3) is a section in which the elongation of the driving chain 7 can be measured and which is affected by the looseness of the driving chain. The section (3) is shorter than the section (1). In other words, most of the measurement sections are the section (1) in which the elongation can accurately be measured, and the number of sections (3) in which the measurement accuracy is lowered is small.

It can be seen from the above that an accurate measurement result can be obtained during the up operation by arranging the sensors of the first embodiment. If, in this case, the sensor 32 is placed as close to the driven sprocket 11 as possible, the section (1) becomes longer and thus more accurate measurement results can be obtained. In addition, if the sensor 31 is placed as close to the driving sprocket 10 as possible, the section (3) becomes shorter and thus the elongation can be measured without being affected by looseness as much as possible.

(During Down Operation) As shown in FIG. 7, during the down operation, the outward path side of the driving chain 7 (the upper chain) is loosened and the return path side (the lower chain) is tightened. Like during the up operation, the elongation detection unit 33a of the diagnostic device 33 detects an elongation amount of the driving chain 7 in a measurement section from the sensor 31 to the sensor 32 with the sensor 31 as a starting point of measurement.

The measurement section in the above case is the sum of a section (1) in which the driving chain 7 is tightened between the driving sprocket 10 on the return path side and the driven sprocket 11, a section (2) in which the driving chain 7 is engaged with the driven sprocket 11 and is not elongated, and a section (3) in which the driving chain 7 is loosened near the driven sprocket 11 on the outward path side.

The section (1) is a section in which the elongation of the driving chain 7 can accurately be measured. The section (2) is a section that is not related to the measurement. The section (3) is a section in which the elongation of the driving chain 7 can be measured and which is affected by the looseness of the driving chain. The section (3) is shorter than the section (1). In other words, most of the measurement sections are the section (1) in which the elongation can accurately be measured, and the number of sections (3) in which the measurement accuracy is lowered is small.

It can be seen from the above that an accurate measurement result can be obtained during the down operation as well as during the up operation. If, in this case, the sensor 31 is placed as close to the driving sprocket 10 as possible, the section (1) becomes longer and thus more accurate measurement results can be obtained. In addition, if the sensor 32 is placed as close to the driven sprocket 11 as possible, the section (3) becomes shorter and thus the elongation can be measured without being affected by looseness as much as possible.

Figure 8:
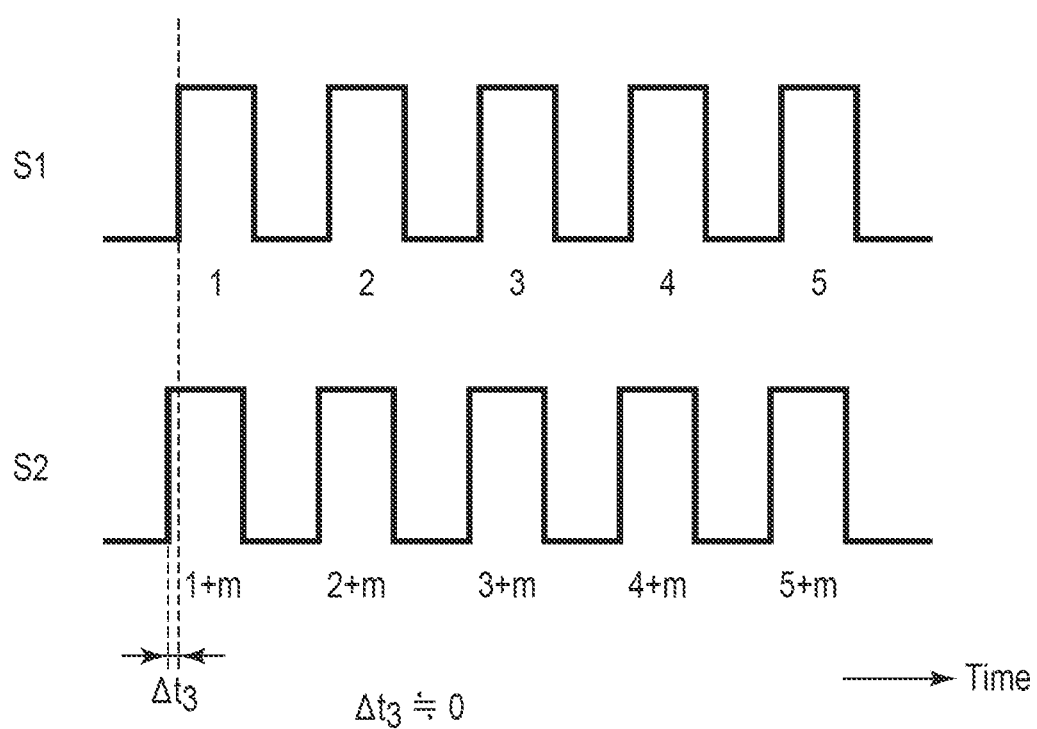
FIG. 8 is a chart showing the state of detection signals of two sensors when the driving chain is not elongated in the first embodiment.
Figure 9:
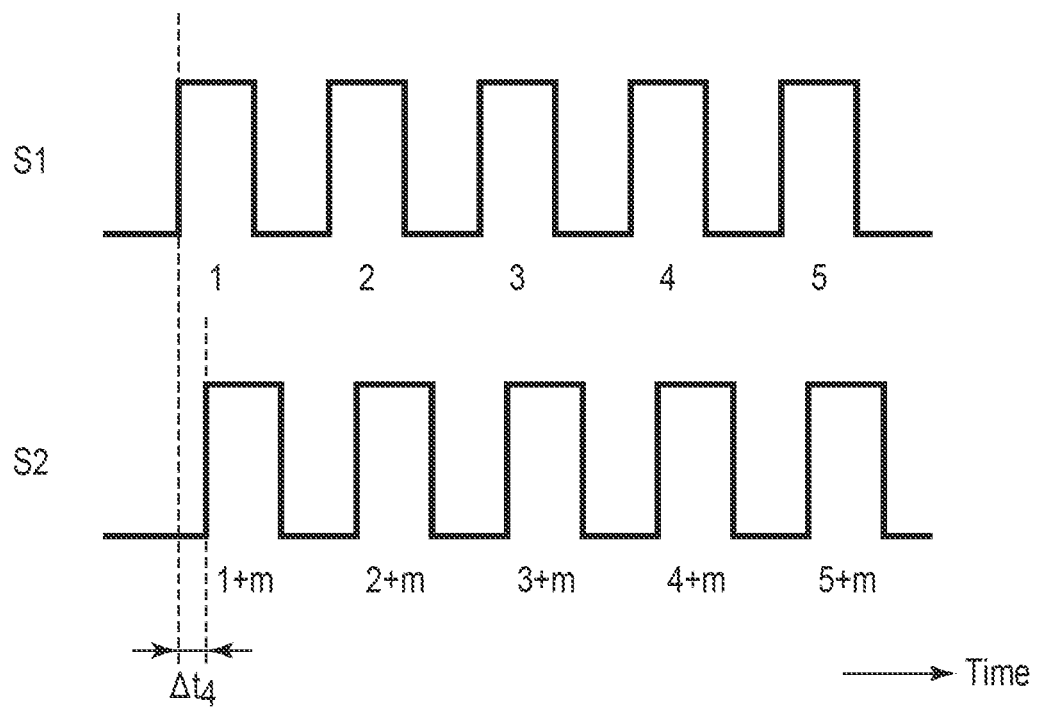
FIG. 9 is a chart showing the state of detection signals of two sensors when the driving chain is elongated in the first embodiment.

FIGS. 8 and 9 show the signal states of the sensors 31 and 32 in the first embodiment. Note that the signal states of the sensors 31 and 32 are substantially the same during the up and down operations of the escalator 1. FIG. 8 shows the states of detection signals S1 and S2 of the sensors 31 and 32 when the driving chain 7 is not elongated. FIG. 9 shows the states of detection signals S1 and S2 of the sensors 31 and 32 when the driving chain 7 is elongated.

In FIGS. 8 and 9, m is the number of links from the sensor 31 to the sensor 32. For example, when the sensor 31 detects the passage of the roller 23 of "1", the sensor 32 disposed m links behind detects the passage of the roller 23 of "1+m".

As shown in FIG. 8, when the driving chain 7 is not elongated, the sensors 31 and 32 detect the passage of each of the rollers 23 of the driving chain 7 with substantially the same timing, and output detection signals S1 and S2. In this case, the detection is affected by looseness in the section (3) even during the up operation and the down operation. Thus, the detection signal S2 tends to be output a little earlier than the detection signal S1, which is negligible in terms of measurement. Therefore, when the driving chain 7 is not elongated, the rise of the detection signal S1 of the sensor 31 and that of the detection signal S2 of the sensor 32 are the same, and a time difference $\Delta t3$ between them is almost 0.

On the other hand, as shown in FIG. 9, when the driving chain 7 is elongated, the timing with which each roller 23 passes the sensor 31 does not coincide with the timing with which each roller 23 disposed m links behind passes the sensor 32. Thus, a time difference $\Delta t4$ is caused between the rise of the detection signal S1 of the sensor 31 and that of the detection signal S2 of the sensor 32. More specifically, the elongation of the driving chain 7 delays the rise of the detection signal S2 and Increases the time difference $\Delta t4$ between them.

As described above, in the sensor arrangement shown in FIGS. 6 and 7, the measurement is slightly affected by looseness in the section (3) and thus actually the detection signal S2 tends to be output a little earlier than the detection signal S1, which is negligible. Accordingly, $\Delta t4$ is a substantially accurate value reflecting the elongation of the chain.

As described above, according to the first embodiment, the use of the two sensors 31 and 32 makes it possible to minimize the affection of the looseness of the driving chain 7 with the same sensor arrangement and measure the chain elongation with high accuracy in both the up and down operations.

Second Embodiment

Next is a description of a second embodiment.

As in the first embodiment, in the second embodiment, the first and second sensors are diagonally disposed apart from each other on the outward and return path sides. However, the second sensor differs from the first embodiment in the arrangement of the first and second sensors.

Figure 10:
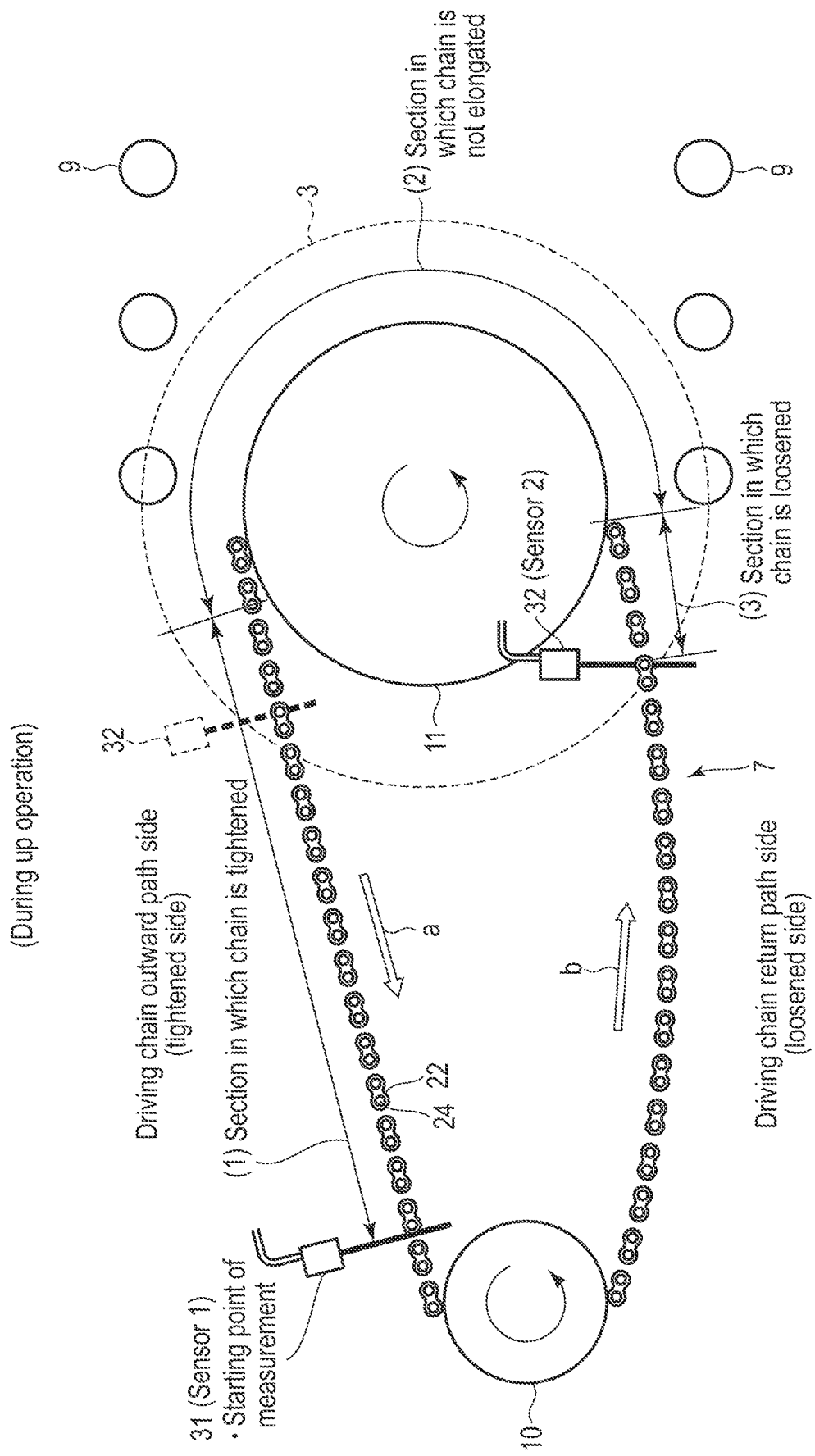
FIG. 10 is an illustration of a method for measuring the elongation of a chain in a second embodiment, showing a state of a driving chain during up operation.

FIGS. 10 and 11 are each an illustration of a method of measuring the elongation of a chain in the second embodiment. FIG. 10 shows a state of a driving chain during the up operation, and FIG. 11 shows a state of the driving chain during the down operation.

In the second embodiment, the sensor 31 is disposed close to the driving sprocket 10 on the outward path side of the moving path, and the sensor 32 is disposed close to the driven sprocket 11 on the return path side of the moving path. The sensor 31 is used as a starting point of measurement as a first sensor to optically detect the passage of each of the rollers 23. The sensor 32 is used as a second sensor to optically detect the passage of each of the rollers 23 at a predetermined number of links behind the sensor 31.

In the sensor arrangement of the second embodiment, when the elongation of the driving chain 7 is measured during the up and down operations of the escalator 1, the measurement is as follows.

(During Up Operation)

As shown in FIG. 10, during the up operation, the outward path side of the driving chain 7 (the upper chain) is tightened and the return path side (the lower chain) is loosened. The sensors 31 and 32 are connected to the diagnostic device 33 shown in FIG. 3A. The elongation detection unit 33a of the diagnostic device 33 detects an elongation amount of the driving chain 7 in a measurement section from the sensor 31 to the sensor 32 with the sensor 31 as a starting point of measurement. More specifically, as the chain 21 moves, the elongation detection unit 33a determines a time difference between the rise timing of the detection signal S1 output from the sensor 31 and the rise timing of the detection signal S2 output from the sensor 32 and detects an elongation amount of the chain 21 based on the time difference.

The measurement section in the above case is the sum of a section (1) in which the driving chain 7 is tightened between the driving sprocket 10 on the outward path side and the driven sprocket 11, a section (2) in which the driving chain 7 is engaged with the driven sprocket 11 and is not elongated, and a section (3) in which the driving chain 7 is loosened near the driven sprocket 11 on the return path side.

Most of the measurement sections are the section (1) in which the elongation can accurately be measured, and the number of sections (3) in which the measurement accuracy is lowered is small. Thus, it can be seen that an accurate measurement result can be obtained during the up operation even by arranging the sensors of the second embodiment. If, in this case, the sensor 31 is placed as close to the driving sprocket 10 as possible, the section (1) becomes longer and thus more accurate measurement results can be obtained. In addition, if the sensor 32 is placed as close to the driven sprocket 11 as possible, the section (3) becomes shorter and thus the elongation can be measured without being affected by looseness as much as possible.

(During Down Operation)

As shown in FIG. 11, during the down operation, the outward path side of the driving chain 7 (the upper chain) is loosened and the return path side (the lower chain) is tightened. Like during the up operation, the elongation detection unit 33a of the diagnostic device 33 detects an elongation amount of the driving chain 7 in a measurement section from the sensor 31 to the sensor 32 with the sensor 31 as a starting point of measurement.

The measurement section in the above case is the sum of a section (1) in which the driving chain 7 is tightened between the driving sprocket 10 on the return path side and the driven sprocket 11, a section (2) in which the driving chain 7 is engaged with the driving sprocket 10 and is not elongated, and a section (3) in which the driving chain 7 is loosened near the driving sprocket 10 on the outward path side.

Most of the measurement sections are the section (1) in which the elongation can accurately be measured, and the number of sections (3) in which the measurement accuracy is lowered is small. Thus, it can be seen from that an accurate measurement result can be obtained during the down operation as well as during the up operation. If, in this case, the sensor 32 is placed as close to the driven sprocket 11 as possible, the section (1) becomes longer and thus more accurate measurement results can be obtained. In addition, if the sensor 31 is placed as close to the driving sprocket 10 as possible, the section (3) becomes shorter and thus the elongation can be measured without being affected by looseness as much as possible.

As described above, as in the first embodiment, in the second embodiment, the use of the two sensors 31 and 32 makes it possible to minimize the affection of the looseness of the driving chain 7 with the same sensor arrangement and measure the chain elongation with high accuracy in both the up and down operations.

Comparison Between First Embodiment and Second Embodiment

The second embodiment has an advantage over the first embodiment in that the sensor 31 (first sensor), which is the starting point of measurement, is placed in the section (1) in which is the driving chain 7 is tightened during the up operation (see FIG. 10). The section (1) is a section in which the elongation of the driving chain 7 can accurately be measured. In the sensor arrangement of the second embodiment, the measurement is started from the section (1) during the up operation. It is thus expected that the measurement accuracy is improved more than that in the first embodiment. On the other hand, during the down operation, the measurement starts from the section (3) that is affected by looseness (see FIG. 11). During the down operation, therefore, it is expected that the measurement accuracy in the sensor arrangement of the first embodiment can be improved more than that in the sensor arrangement of the second embodiment.

As described above, the sensor arrangement of the second embodiment is effective for escalators whose main operation is up operation, and more accurate measurement results can be obtained than in the down operation. On the other hand, the sensor arrangement of the first embodiment is effective for escalators whose main operation is down operation, and more accurate measurement results can be obtained than in the up operation. However, in both the sensor arrangement of the first embodiment and the sensor arrangement of the second embodiment, the chain elongation can be measured with high accuracy in both the up and down operations, and the same advantageous effect can be obtained from either of the up and down operations if an escalator can switch between the up and down operations.

Third Embodiment

Next is a description of a third embodiment.

Between the first and second embodiments, there is no large difference in measurement accuracy of chain elongation. However, it is advantageous in terms of measurement accuracy that a sensor serving as a starting point of measurement is placed on the chain that is tightened. In other words, during the up operation, the second embodiment is advantageous over the first embodiment because the sensor serving as a starting point of measurement is placed on the chain that is tightened. In the third embodiment, therefore, a new sensor is added onto the chain that is tightened during the up operation in the sensor arrangement of the first embodiment to improve the measurement accuracy during the up operation.

Figure 12:
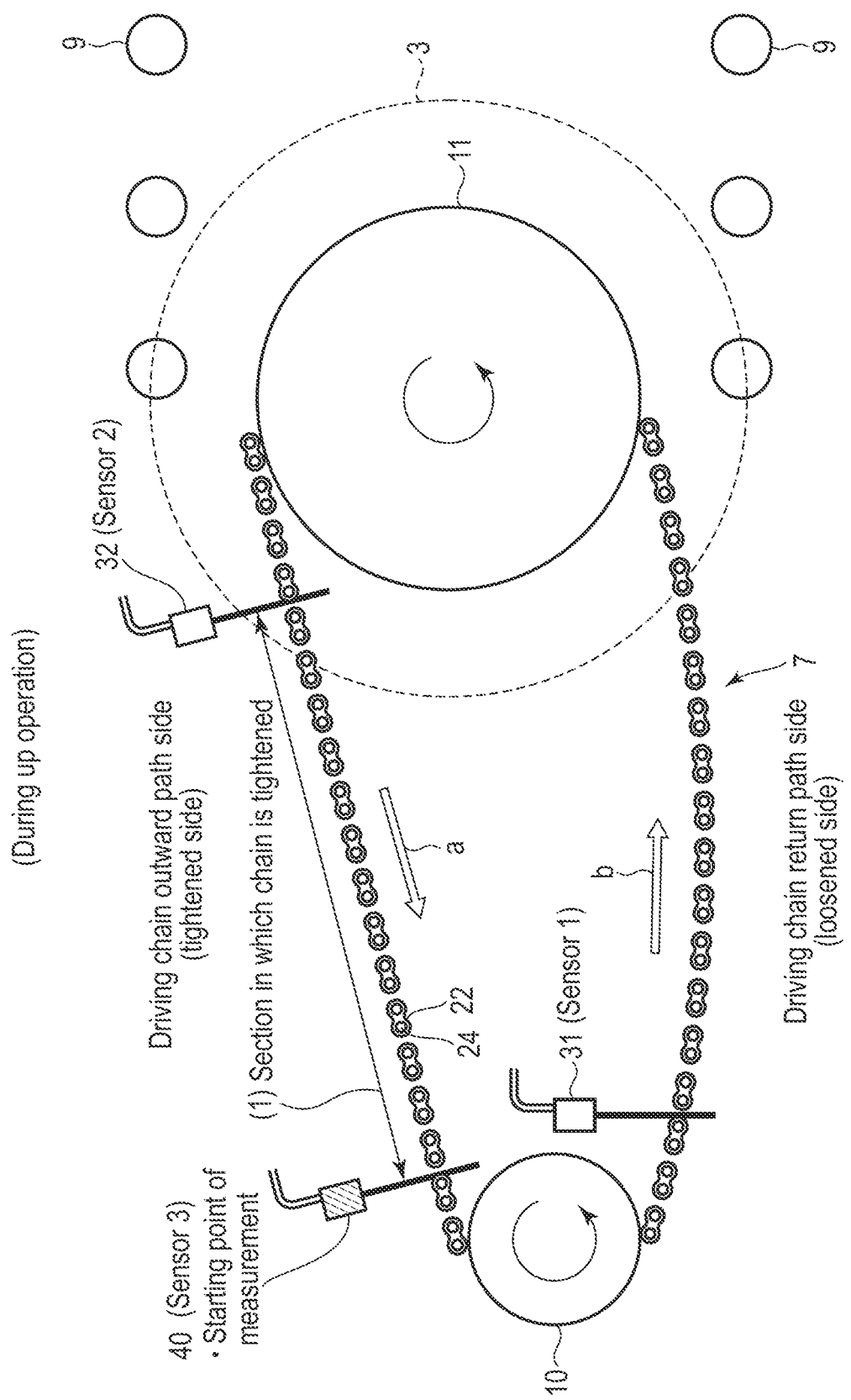
FIG. 12 is an illustration of a method for measuring the elongation of a chain in a third embodiment, showing a state of a driving chain during up operation.
Figure 13:
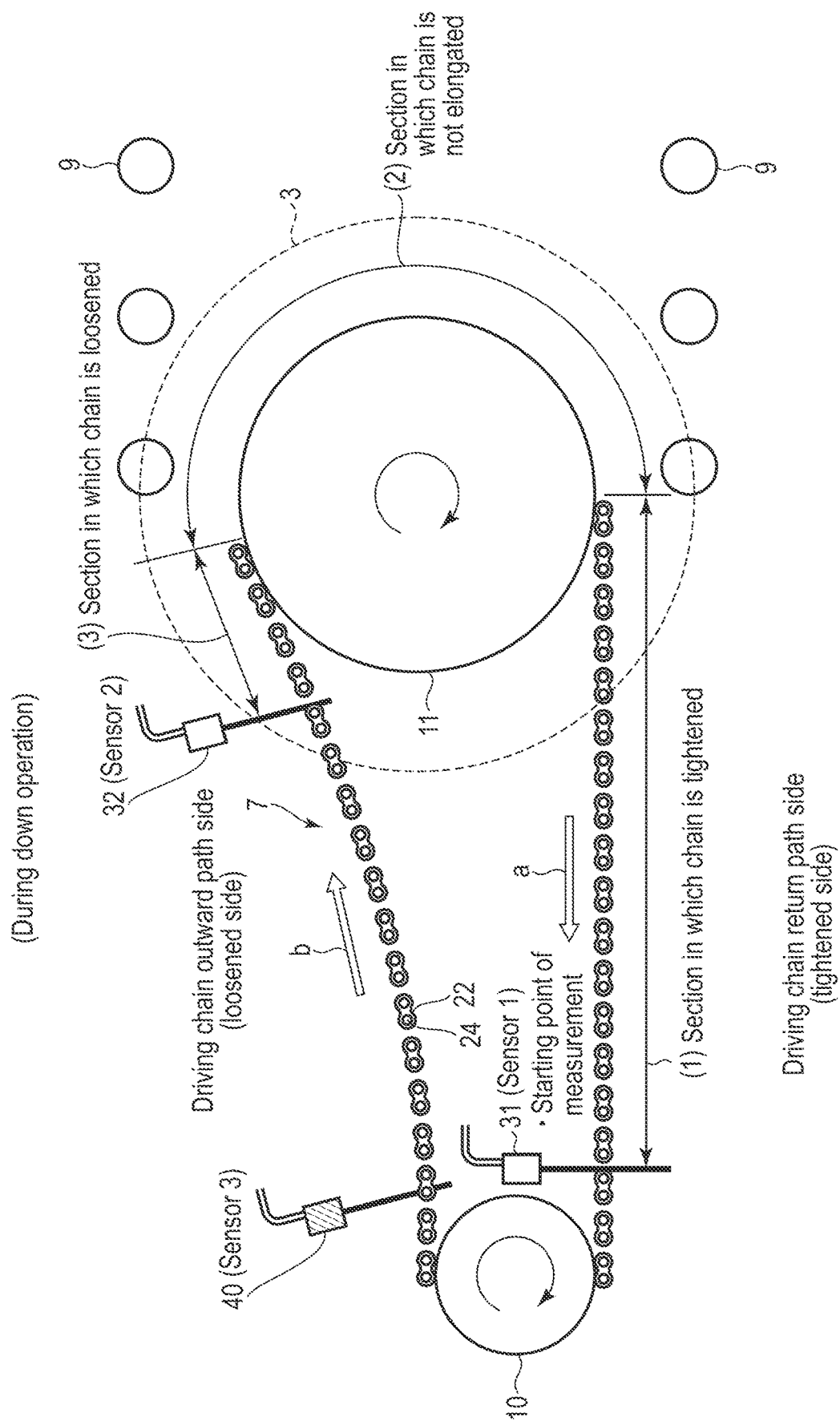
FIG. 13 is an illustration of a method for measuring the elongation of a chain in the third embodiment, showing a state of the driving chain during down operation.

FIGS. 12 and 13 are each an illustration of a method of measuring the elongation of a chain in the third embodiment. FIG. 12 shows a state of a driving chain during the up operation, and FIG. 13 shows a state of the driving chain during the down operation.

The arrangement of the sensors 31 and 32 in the third embodiment is the same as that in the first embodiment (FIGS. 6 and 7). Specifically, the sensor 31 is placed close to the driving sprocket 10 on the return path side of the moving path of the driving chain 7. The sensor 32 is placed close to the driven sprocket 11 on the outward path side of the moving path of the driving chain 7.

In the third embodiment, as shown in FIGS. 12 and 13, a sensor 40 is used in addition to the sensors 31 and 32. In these figures, the sensor 40 means a third sensor and is represented as "sensor 3". The same applies to other figures.

The sensor 40 is placed close the driving sprocket 10 on the outward path side on which the chain is tightened during the up operation, and opposed to and separated from the sensor 32 by a prescribed number of links. Like the sensors 31 and 32, the sensor 40 is, for example, a diffuse reflection type photoelectric sensor to optically detect the passage of a plurality of rollers 23 provided on the driving chain 7 at regular pitches. The sensor 40 is connected to the diagnostic device 33, and outputs a detection signal S3 to the diagnostic device 33 when the sensor 40 detects the passage of each of the rollers 23.

In the sensor arrangement of the third embodiment, when the elongation of the driving chain 7 is measured during the up and down operations of the escalator 1, the elongation is as follows.

(During Up Operation)

As shown in FIG. 12, during the up operation, the outward path side of the driving chain 7 (the upper chain) is tightened and the return path side (the lower chain) is loosened. The sensors 31, 32 and 40 are connected to the diagnostic device 33 shown in FIG. 3A.

During the up operation, the elongation detection unit 33a of the diagnostic device 33 selects the sensors 40 and 32 from among the sensors 31, 32 and 40, and detects an elongation amount of the driving chain 7 in a measurement section from the sensor 40 to the sensor 32 with the sensor 40 as a starting point of measurement. More specifically, as the chain 21 moves, the elongation detection unit 33a determines a time difference between the rise timing of the detection signal S3 output from the sensor 40 and the rise timing of the detection signal S2 output from the sensor 32 and detects an elongation amount of the chain 21 based on the time difference.

The measurement section in the above case is only the section (1) in which the driving chain 7 is tightened between the driving sprocket 10 on the outward path side and the driven sprocket 11. That is, during the up operation, the elongation is measured on only the side on which the driving chain 7 is tightened, with the result that more accurate measurement results can be obtained than in the first embodiment described above.

(During Down Operation)

As shown in FIG. 13, during the down operation, the outward path side of the driving chain 7 (the upper chain) is loosened and the return path side (the lower chain) is tightened. During the down operation, the sensor 40 is not used, but the sensors 31 and 32 are used as in the first embodiment. Specifically, the elongation detection unit 33a of the diagnostic device 33 detects an elongation amount of the driving chain 7 in a measurement section from the sensor 31 to the sensor 32 with the sensor 31 as a starting point of measurement.

The measurement section in the above case is the sum of section (1), section (2) and section (3). Since, however, the sensor 31 that is a starting point of measurement is provided in front of the driving chain 7 that is tightened and a number of sections (1) are included, accurate measurement results can be obtained.

Figure 14:
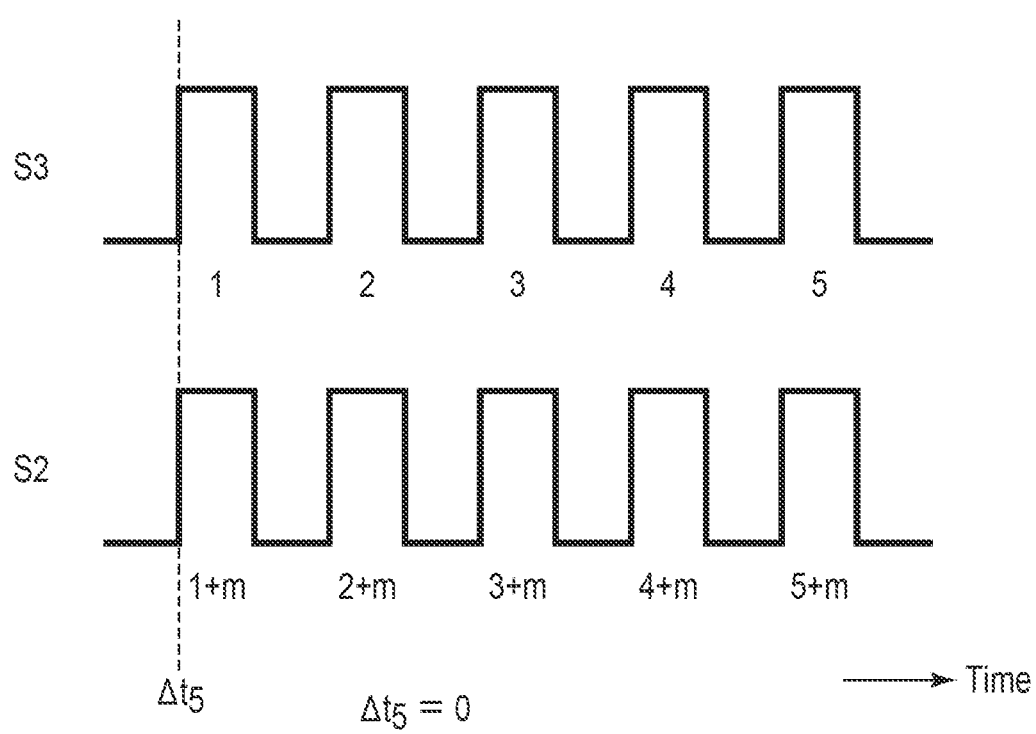
FIG. 14 is a chart showing the state of signals of two sensors during up operation and showing a signal state when the driving chain is not elongated.
Figure 15:
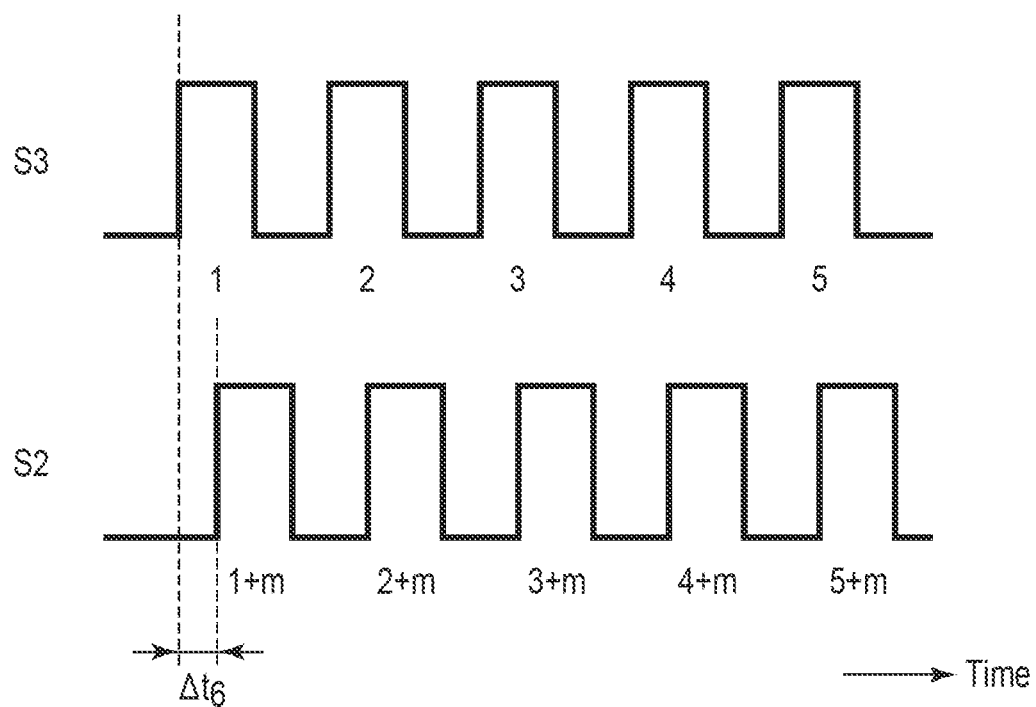
FIG. 15 is a chart showing the state of signals of two sensors during down operation and showing a signal state when the driving chain is elongated.

FIGS. 14 and 15 show the signal states of the sensors 40 and 32 during the up operation in the third embodiment. FIG. 14 shows the states of detection signals S3 and S2 of the sensors 40 and 32 when the driving chain 7 is not elongated. FIG. 15 shows the states of detection signals S3 and S2 of the sensors 40 and 32 when the driving chain 7 is elongated.

In FIGS. 14 and 15, m is the number of links from the sensor 40 to the sensor 32. For example, when the sensor 40 detects the passage of the roller 23 of "1", the sensor 32 disposed m links behind detects the passage of the roller 23 of "1÷m".

As shown in FIG. 14, when the driving chain 7 is not elongated, the sensors 40 and 32 detect the passage of each of the rollers 23 of the driving chain 7 with substantially the same timing, and output detection signals S3 and S2. In this case, during the up operation, the measurement is made only in the section (1) using the added sensor 40. Thus, the rise of the detection signal S3 of the sensor 40 and that of the detection signal S2 of the sensor 32 are the same, and a time difference Δt5 between them is 0.

On the other hand, as shown in FIG. 15, when the driving chain 7 is elongated, the timing with which each roller 23 passes the sensor 40 does not coincide with the timing with which each roller 23 placed m links behind passes the sensor 32. Thus, a time difference Δt6 is caused between the rise of the detection signal S3 of the sensor 40 and that of the detection signal S2 of the sensor 32. More specifically, the elongation of the driving chain 7 delays the rise of the detection signal S2 and increases the time difference Δt6 between them. In the sensor arrangement of the third embodiment, the measurement is not affected by looseness at all during the up operation. Therefore, the time difference Δt6 is a correct value that reflects the chain elongation.

During the down operation, the chain elongation is measured using the sensors 31 and 32 as in the first embodiment as described above. The states of the detection signals S1 and S2 in this case are the same as those in FIGS. 8 and 9.

As described above, according to the third embodiment, in the sensor arrangement of the first embodiment, the new sensor 40 is added onto the chain that is tightened during the up operation, and the chain elongation is measured with the sensor 40 as a starting point of measurement, thus making it possible to improve measurement accuracy in the up operation further.

Fourth Embodiment

Next is a description of a fourth embodiment.

According to the third embodiment, in the sensor arrangement of the first embodiment, a new sensor is added onto the chain that is tightened during the up operation to improve measurement accuracy in the up operation. According to the fourth embodiment, in the sensor arrangement of the second embodiment, a new sensor is added onto the chain that is tightened during the down operation to improve measurement accuracy in the down operation.

Figure 16:
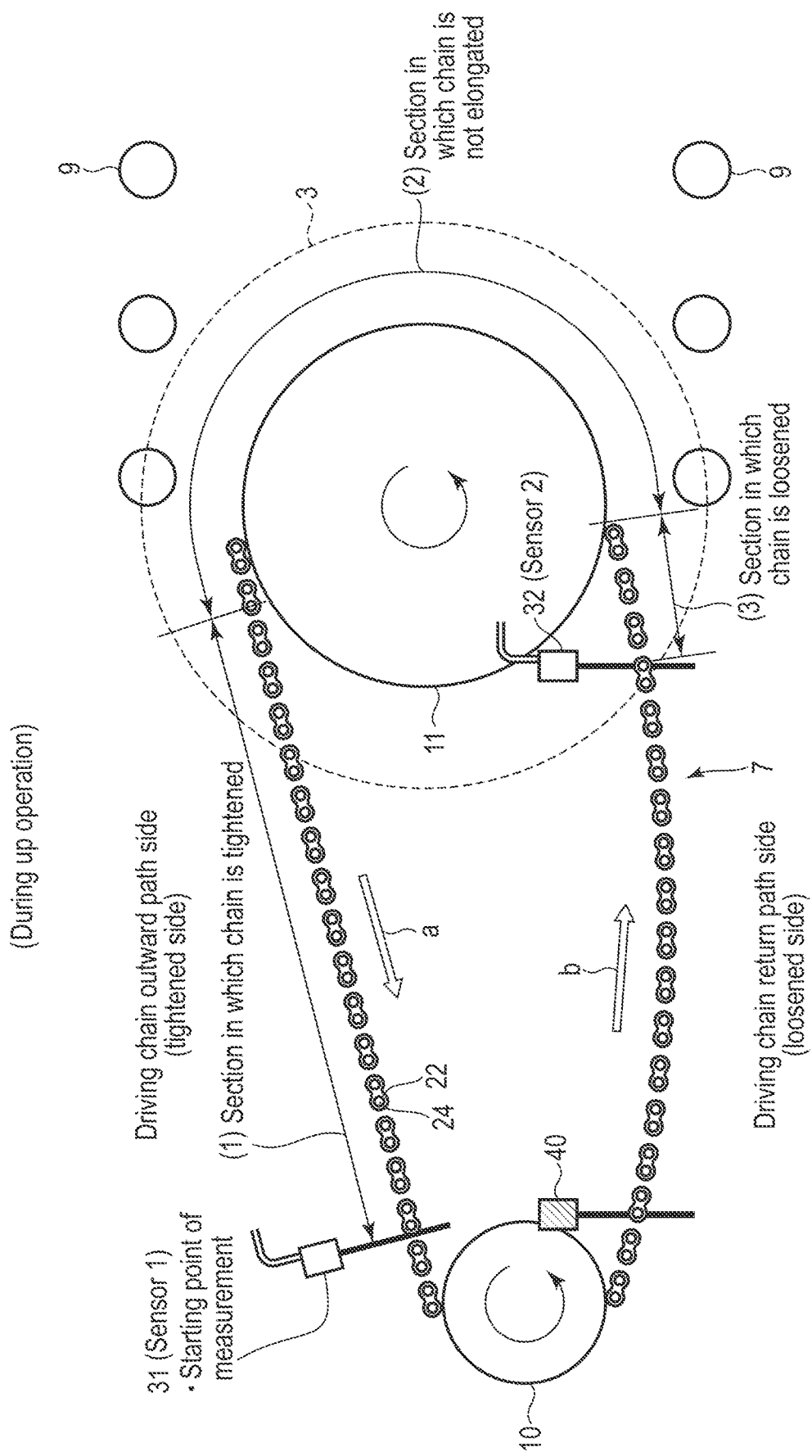
FIG. 16 is an illustration of a method for measuring the elongation of a chain in a fourth embodiment, showing a state of the driving chain during up operation.
Figure 17:
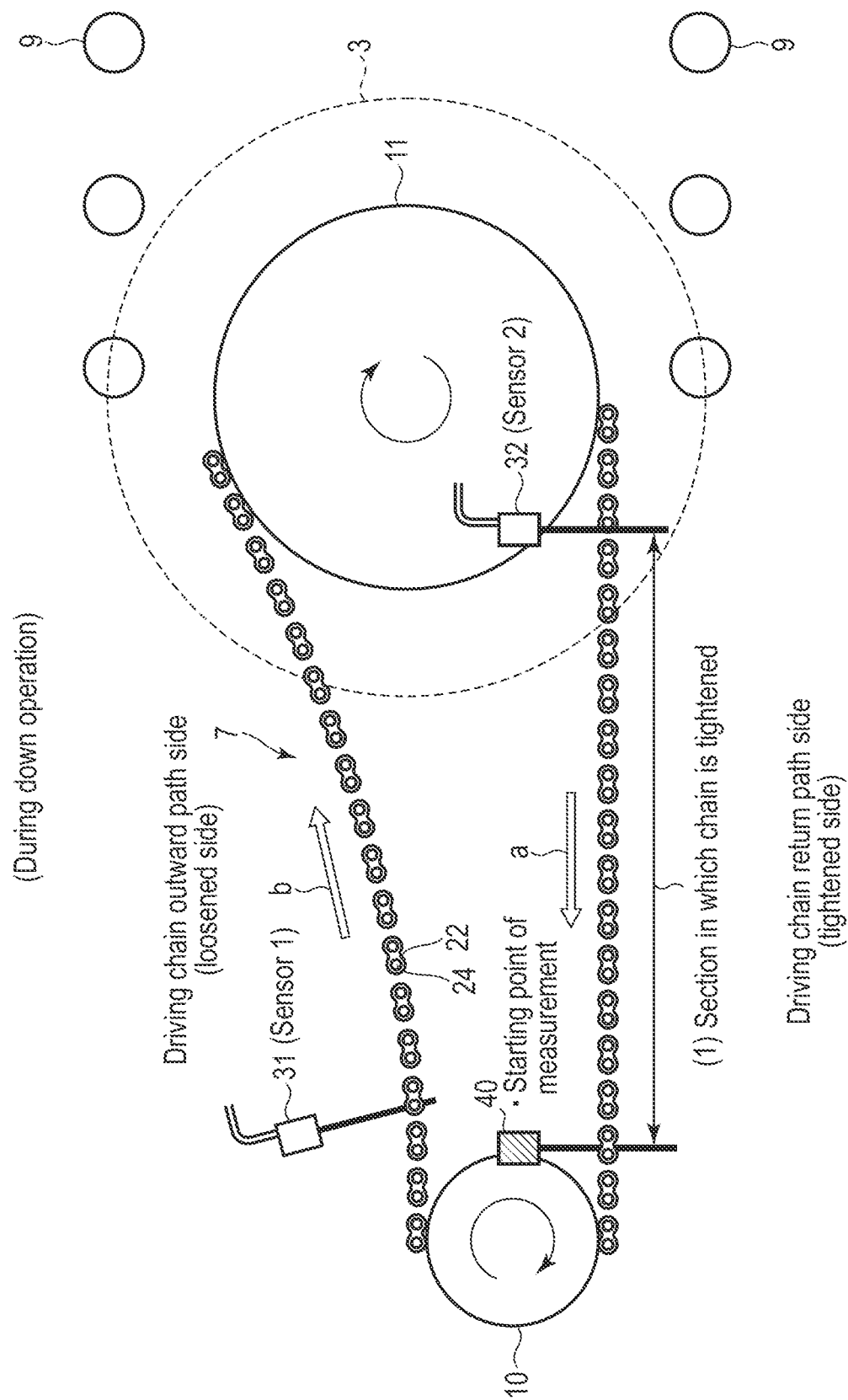
FIG. 17 is an illustration of a method for measuring the elongation of a chain in the fourth embodiment, showing a state of the driving chain during down operation.

FIGS. 16 and 17 are each an illustration of a method of measuring the elongation of a chain in the fourth embodiment. FIG. 16 shows a state of a driving chain during the up operation, and FIG. 17 shows a state of the driving chain during the down operation.

The arrangement of the sensors 31 and 32 in the fourth embodiment is the same as that in the second embodiment (FIGS. 10 and 11). Specifically, the sensor 31 is placed close to the driving sprocket 10 on the outward path side of the moving path of the driving chain 7. The sensor 32 is placed close to the driven sprocket 11 on the return path side of the moving path of the driving chain 7.

In the fourth embodiment, a sensor 40 is used in addition to the sensors 31 and 32. The sensor 40 is placed close the driving sprocket 10 on the return path side on which the chain is tightened during the down operation, and opposed to and separated from the sensor 32 by a prescribed number of links. Like the sensors 31 and 32, the sensor 40 is, for example, a diffuse reflection type photoelectric sensor to optically detect the passage of a plurality of rollers 23 provided on the driving chain 7 at regular pitches. The sensor 40 is connected to the diagnostic device 33, and outputs a detection signal S3 to the diagnostic device 33 when the sensor 40 detects the passage of each of the rollers 23.

In the sensor arrangement of the fourth embodiment, when the elongation of the driving chain 7 is measured during the up and down operations of the escalator 1, the elongation is as follows.

(During Up Operation)

As shown in FIG. 16, during the up operation, the outward path side of the driving chain 7 (the upper chain) is tightened and the return path side (the lower chain) is loosened. The sensors 31, 32 and 40 are connected to the diagnostic device 33 shown in FIG. 3A.

During the up operation, the sensor 40 is not used, but the sensors 31 and 32 are used as in the first embodiment. That is, the elongation detection unit 33a of the diagnostic device 33 detects an elongation amount of the driving chain 7 in a measurement section from the sensor 31 to the sensor 32 with the sensor 31 as a starting point of measurement.

More specifically, as the chain 21 moves, the elongation detection unit 33a determines a time difference between the rise timing of the detection signal S1 output from the sensor 31 and the rise timing of the detection signal S2 output from the sensor 32 and detects an elongation amount of the chain 21 based on the time difference.

The measurement section in the above case is the sum of section (1), section (2) and section (3). Since, however, the starting point of measurement is located in front of the driving chain 7 that is tightened and a number of sections (1) are included, accurate measurement results can be obtained.

(During Down Operation)

As shown in FIG. 17, during the down operation, the outward path side of the driving chain 7 (the upper chain) is loosened and the return path side (the lower chain) is tightened. The elongation detection unit 33a of the diagnostic device 33 selects the sensors 40 and 32 from among the sensors 31, 32 and 40, and detects an elongation amount of the driving chain 7 in a measurement section from the sensor 40 to the sensor 32 with the sensor 40 as a starting point of measurement. More specifically, as the chain 21 moves, the elongation detection unit 33a determines a time difference between the rise timing of the detection signal S3 output from the sensor 40 and the rise timing of the detection signal S2 output from the sensor 32 and detects an elongation amount of the chain 21 based on the time difference.

The measurement section in the above case is only the section (1) in which the driving chain 7 is tightened between the driving sprocket 10 on the return path side and the driven sprocket 11. That is, during the down operation, the elongation is measured on only the side on which the driving chain 7 is tightened, with the result that more accurate measurement results can be obtained than in the second embodiment described above.

As described above, according to the fourth embodiment, in the sensor arrangement of the second embodiment, the new sensor 40 is added onto the chain that is tightened during the down operation, and the chain elongation is measured with the sensor 40 as a starting point of measurement, thus making it possible to improve measurement accuracy in the down operation further.

Fifth Embodiment

Next is a description of a fifth embodiment.

According to the fifth embodiment, in the sensor arrangement of the third embodiment, two of the three sensors are selected to measure the elongation of a chain that is tightened and that of a chain that is loosened.

Figure 18:
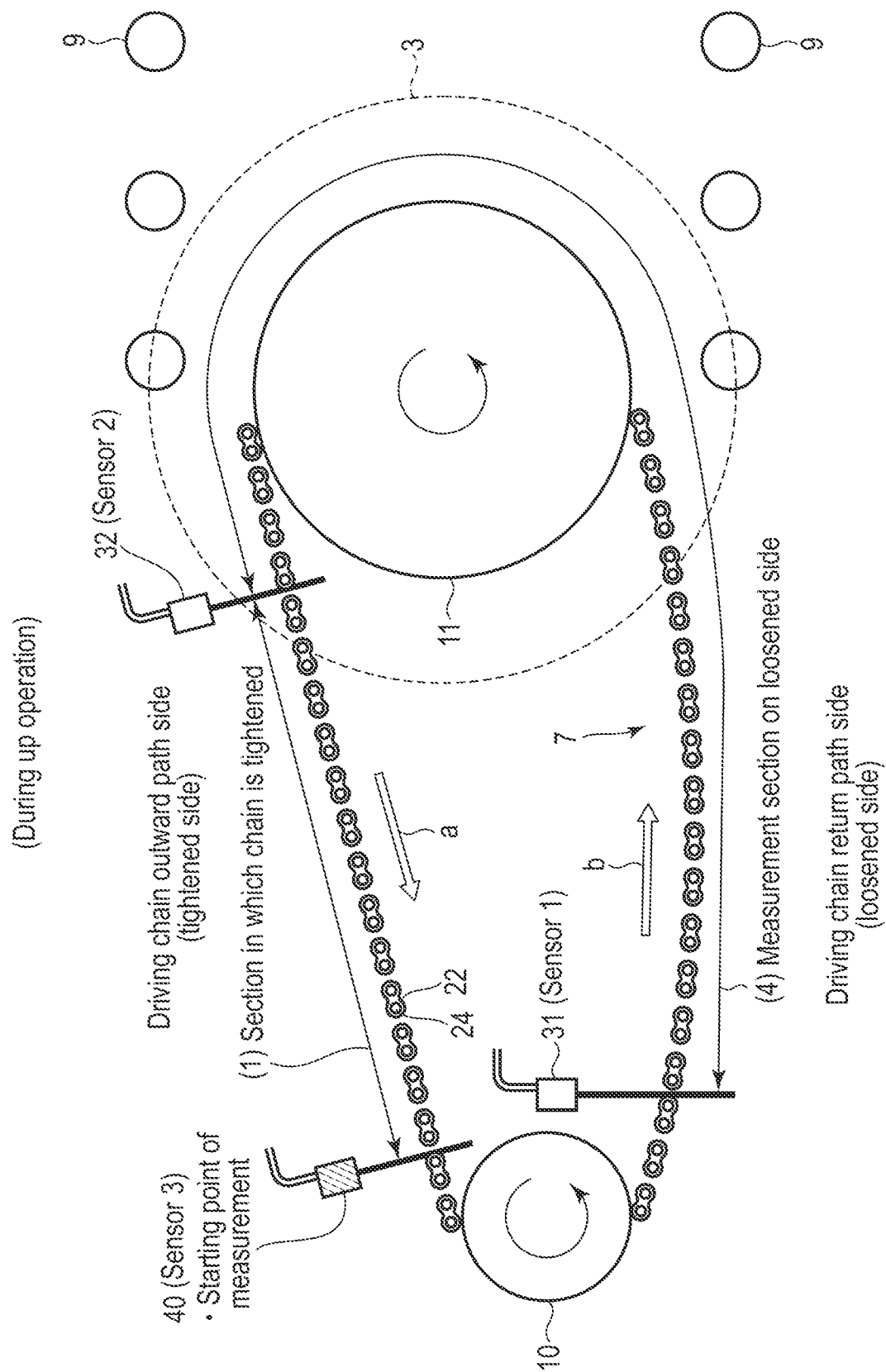
FIG. 18 is an illustration of a method for measuring the elongation of a chain in a fifth embodiment, showing a state of a driving chain during up operation.
Figure 21:
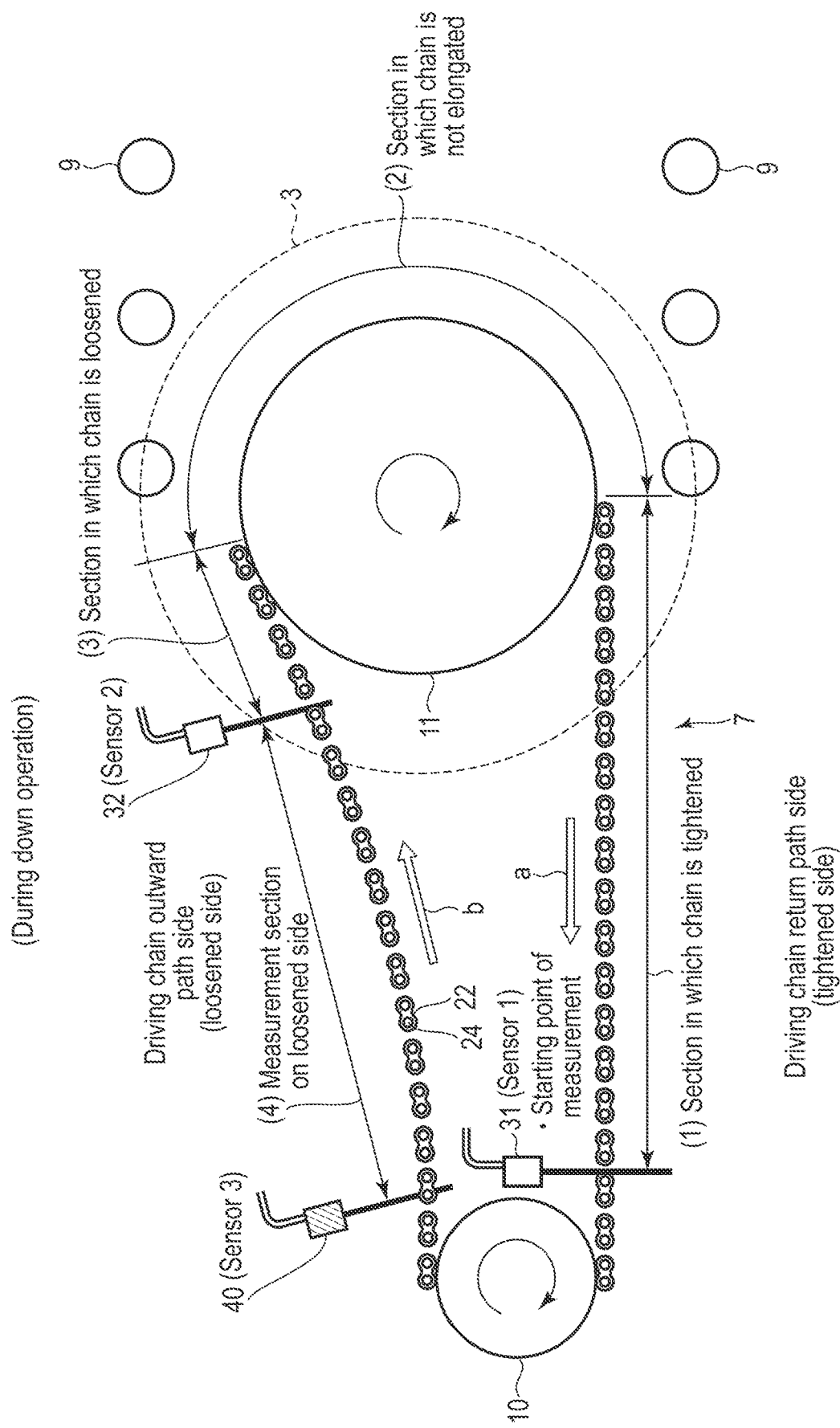
FIG. 21 is an illustration of a method for measuring the elongation of a chain in the fifth embodiment, showing a state of the driving chain during down operation.

FIG. 18 is an illustration of a method of measuring the elongation of a chain in the fifth embodiment, showing a state of the driving chain during the up operation. FIG. 21 shows a state of the driving chain during the down operation.

The sensor arrangement in the fifth embodiment is similar to that in the third embodiment (FIG. 12). That is, the sensor 31 is placed close to the driving sprocket 10 on the return path side of the moving path of the driving chain 7. The sensor 32 is placed close to the driven sprocket 11 on the outward path side of the moving path of the driving chain 7. In addition to the sensors 31 and 32, another sensor 40 is placed opposite to the sensor 32 near the driving sprocket 10 on the outward passage side on which the chain is tightened during the up operation.

In the fifth embodiment, two of the sensors 31, 32 and 40 are selected to measure (a) the elongation of a chain that is tightened and (b) the elongation of a chain that is loosened.

(During Up Operation)

As shown in FIG. 18, during the up operation, the outward path side of the driving chain 7 (the upper chain) is tightened and the return path side (the lower chain) is loosened. The sensors 31, 32 and 40 are connected to the diagnostic device 33 shown in FIG. 3A.

(a) Measurement of Elongation of Tightened Chain

The measurement of the elongation of a chain that is tightened is similar to the measurement in the up operation of the third embodiment described above. That is, the elongation detection unit 33a of the diagnostic device 33 selects the sensors 40 and 32 from among the sensors 31, 32 and 40, and detects an elongation amount of the driving chain 7 in a measurement section from the sensor 40 to the sensor 32 with the sensor 40 as a starting point of measurement. More specifically, as the chain 21 moves, the elongation detection unit 33a determines a time difference between the rise timing of the detection signal S3 output from the sensor 40 and the rise timing of the detection signal S2 output from the sensor 32 and detects an elongation amount of the chain 21 based on the time difference.

The measurement section in the above case is only the section (1) in which the driving chain 7 is tightened between the driving sprocket 10 on the outward path side and the driven sprocket 11. That is, during the up operation, the elongation is measured on only the side on which the driving chain 7 is tightened.

(b) Measurement of Elongation of Loosened Chain

The elongation detection unit 33a selects the sensors 32 and 31 from among the sensors 31, 32 and 40. Then, the elongation detection unit 33a changes the starting point of measurement to the sensor 32, and detects an elongation amount of the driving chain 7 in a measurement section from the sensor 32 to the sensor 31. Specifically, as the chain 21 moves, the elongation detection unit 33a determines a time difference between the rise timing of the detection signal S2 output from the sensor 32 and the rise timing of the detection signal S1 output from the sensor 31 and detects an elongation amount of the chain 21 based on the time difference.

The measurement section in the above case includes a section (4) in which the driving chain 7 is loosened on the return path side as shown in FIG. 18. That is, if the sensor 32 is used as the starting point of measurement, the chain elongation in the measurement section on the loosened side can be measured using the sensors 32 and 31.

Figure 19:
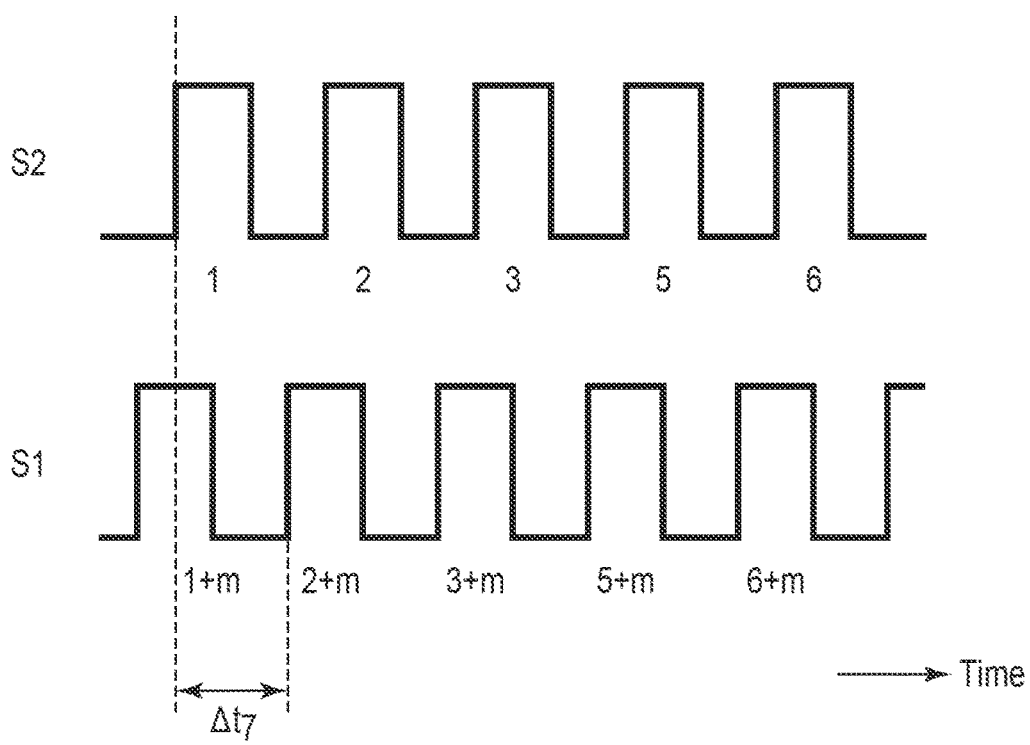
FIG. 19 is a diagram showing the state of detection signals of two sensors used when the elongation of a loosened chain is measured in the fifth embodiment.

FIG. 19 is a diagram showing the state of detection signals S2 and S1 of sensors 32 and 31 used when the elongation of a loosened chain is measured.

On the side on which the driving chain 7 is loosened, the roller 23 of "1" tends to pass the forward sensor 32 after the roller 23 of "1+m" passes the backward sensor 31. In other words, the detection signal S1 is output earlier than the detection signal S2. Therefore, when the detection signal S2 of the roller 23 of "1" is output, the rise timing of the detection signal S2 cannot be compared with that of the detection signal S1 of the roller 23 of "1+m".

Therefore, when the elongation of the driving chain 7 that is loosened is measured, the roller 23 of "2+m" is compared with the roller 23 of "1" as shown in FIG. 19. That is, a time difference Δt7 between the rise timing of detection signal S2 output when the roller 23 of "1" passes the forward sensor 32 and the rise timing of detection signal S1 output when the roller 23 of "2+m" passes the backward sensor 31 is detected. The amount of elongation on the loosened side is obtained from the time difference Δt7. Since, in this case, the roller 23 of "2+m" is compared with the roller 23 of "1", the elongation amount needs to be calculated from Δt7 using a threshold value other than a threshold value for use in calculating the elongation amount on the tightened side.

Figure 20:
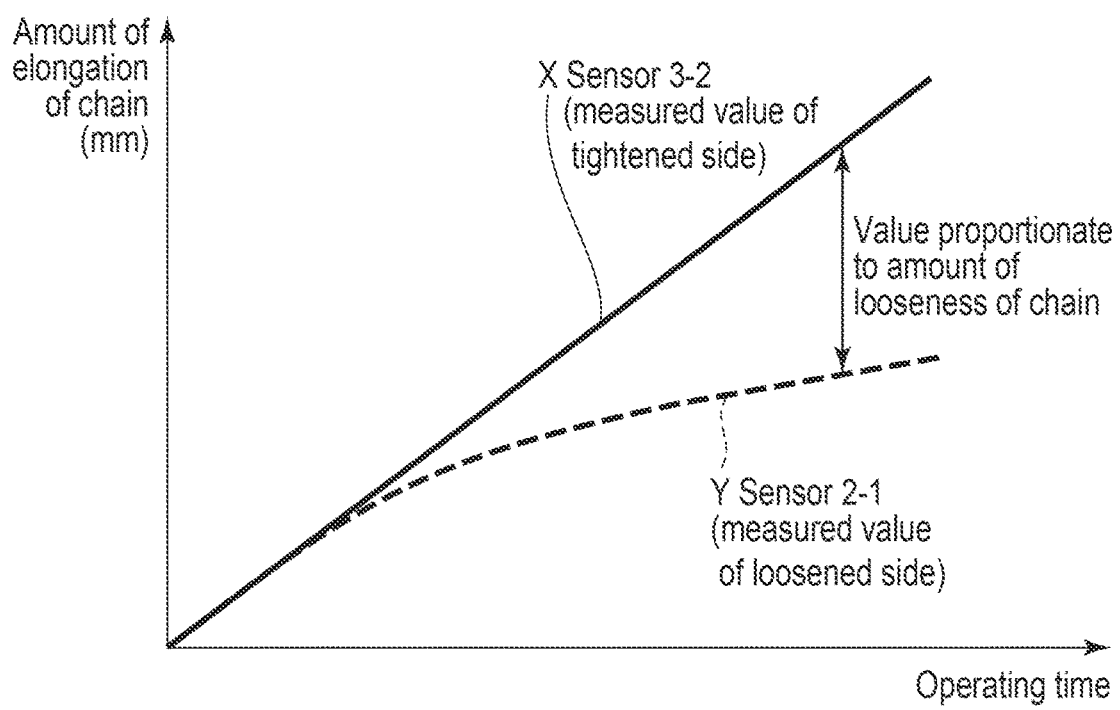
FIG. 20 is a graph showing a comparison between a measured value on the tightened side and a measured value on the loosened side in the fifth embodiment.

FIG. 20 shows a comparison between a measurement result on the tightened side and a measurement result on the loosened side.

If the amount of looseness of the driving chain 7 is small as in the initial state, a measured value Y obtained on the loosened side and a measured value X obtained on the tightened side are substantially the same. With the aging of the driving chain 7, however, the looseness of the driving chain 7 tends to increase as well as the elongation. Since, in this case, the measurement on the loosened side is greatly affected by the looseness, an accurate measurement result cannot be obtained.

Usually, the amount of looseness of the driving chain 7 can be estimated from changes in the amount of elongation of the driving chain 7. If, however, the degree of tightness of the driving chain 7 in the initial state is not known, the amount of change in the amount of elongation is not known, and therefore the amount of looseness cannot be estimated, either.

In the fifth embodiment, an accurate amount of elongation is measured using the sensors 40 and 32 on the tightened side, and an amount of elongation is measured using the sensors 32 and 31 on the loosened side, too. Therefore, even though the degree of tightness of the driving chain 7 in the initial state is not known, the amount of looseness can be obtained from an error between the measured value X obtained on the loosened side and the measured value Y obtained on the loosened side.

When the driving chain 7 is elongated with an increase in the operating time, the measured value X has a linear characteristic because an accurate elongation amount can be measured on the tightened side. On the loosened side, the elongation amount is measured to be smaller than the actual one. That is, the measured value Y includes an amount of looseness and has a nonlinear characteristic. The error between the measured values X and Y represents the amount of looseness. The larger the error, the looser the driving chain 7. The abnormality determination unit 33b shown in FIG. 3A determines an amount of looseness from the error between the measured values X and Y obtained by the elongation detection unit 33a, and warns the control device 14 when the amount of loo exceeds a preset value.

(During Down Operation)

As shown in FIG. 21, during the down operation, the outward path side of the driving chain 7 (the upper chain) is loosened and the return path side (the lower chain) is tightened. The sensors 31, 32 and 40 are connected to the diagnostic device 33 shown in FIG. 3A. Like during the up operation, the elongation detection unit 33a of the diagnostic device 33 selects two of the sensors 31, 32 and 40 to measure (a) the elongation of a chain that is tightened and (b) the elongation of a chain that is loosened.

(a) Measurement of Elongation of Tightened Chain

The measurement of the elongation of a chain that is tightened is similar to the measurement during the down operation of the third embodiment described above. That is, the elongation detection unit 33a of the diagnostic device 33 selects the sensors 31 and 32 from among the sensors 31, 32 and 40, and detects an elongation amount of the driving chain 7 in a measurement section from the sensor 31 to the sensor 32 with the sensor 31 as a starting point of measurement. The elongation amount in this case is an amount of elongation of a chain that is tightened, and is an accurate value (measured value X).

(b) Measurement of Elongation of Loosened Chain

The elongation detection unit 33a selects the sensors 40 and 32 from among the sensors 31, 32 and 40. Then, the elongation detection unit 33a changes the starting point of measurement to the sensor 32, and detects an elongation amount of the driving chain 7 in a measurement section from the sensor 32 to the sensor 40.

The measurement section in the above case includes a section (4) in which the driving chain 7 is loosened on the return path side as shown in FIG. 21. That is, if the sensor 32 is used as the starting point of measurement, the chain elongation in the measurement section on the loosened side can be measured using the sensors 32 and 40 (measured value Y).

If the measured values X and Y are compared in the same manner as during the up operation, an amount of looseness can be obtained from an error between them. The abnormality determination unit 33b shown in FIG. 3A warns the control device 14 when the amount of looseness is equal to or larger than a preset value.

According to the fifth embodiment described above, three sensors are provided, and two of these sensors are selected to measure the elongation of a chain that is tightened and the elongation of a chain that is loosened, with the result that an amount of looseness as well as an amount of elongation can be detected. In this case, too, the looseness of a chain as well as the elongation of a chain can be measured with high accuracy during both the up and down operations.

The fifth embodiment has been described, taking the sensor arrangement of the third embodiment as an example. The same applies to the sensor arrangement of the fourth embodiment. That is, in the sensor arrangement shown in FIGS. 16 and 17, two of the three sensors 31, 32 and 40 are selected in accordance with the operating direction of the escalator 1 to measure the elongation of the chain that is tightened and the elongation of the chain that is loosened, with the result that the amount of looseness as well as the amount of elongation can be detected.

Sixth Embodiment

Next is a description of a sixth embodiment.

According to the sixth embodiment, in the sensor arrangement of the first embodiment, two sensors are used to measure the elongation of a chain that is tightened and that of a chain that is loosened.

Figure 22:
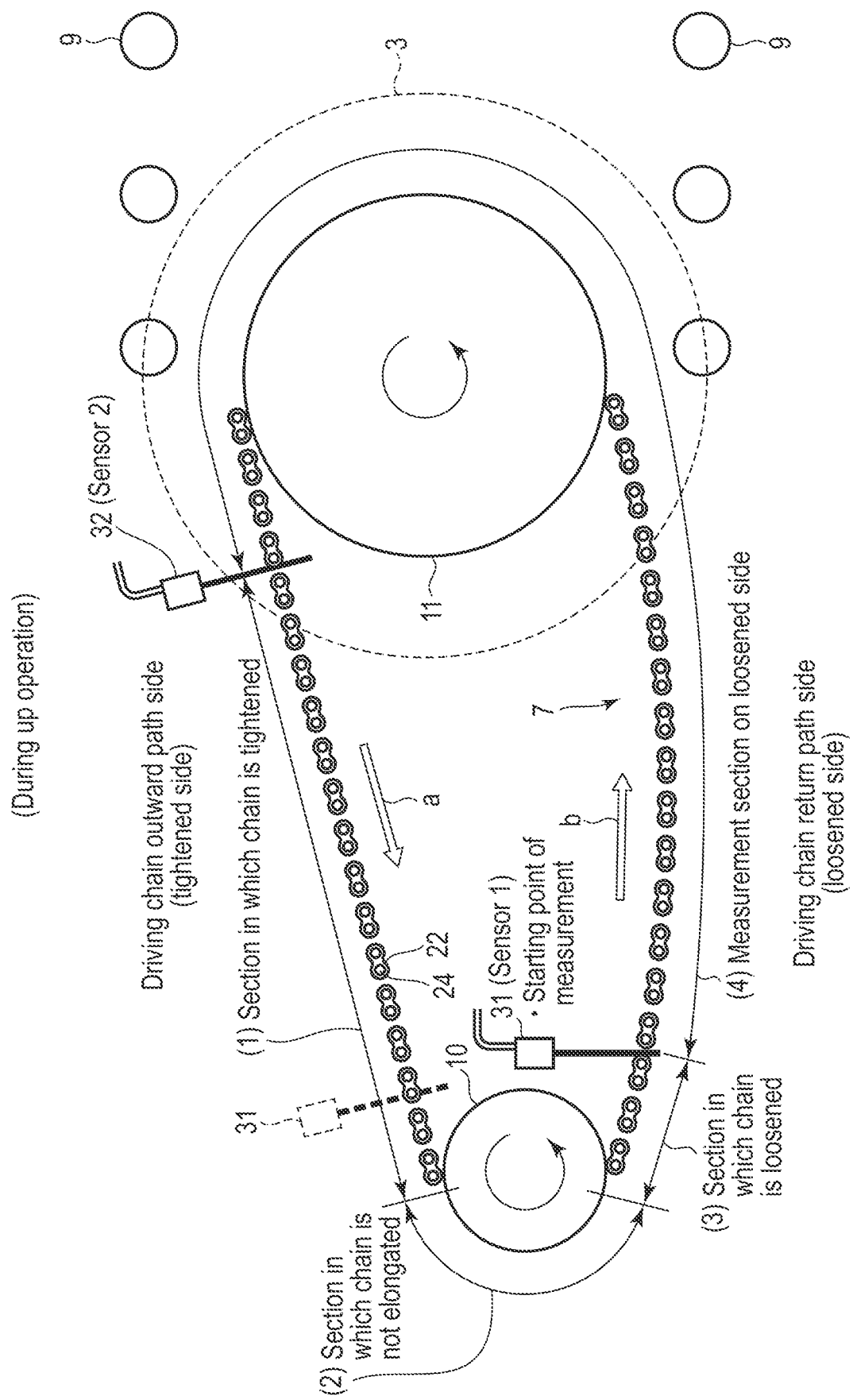
FIG. 22 is an illustration of a method for measuring the elongation of a chain in a sixth embodiment, showing a state of a driving chain during up operation.
Figure 23:
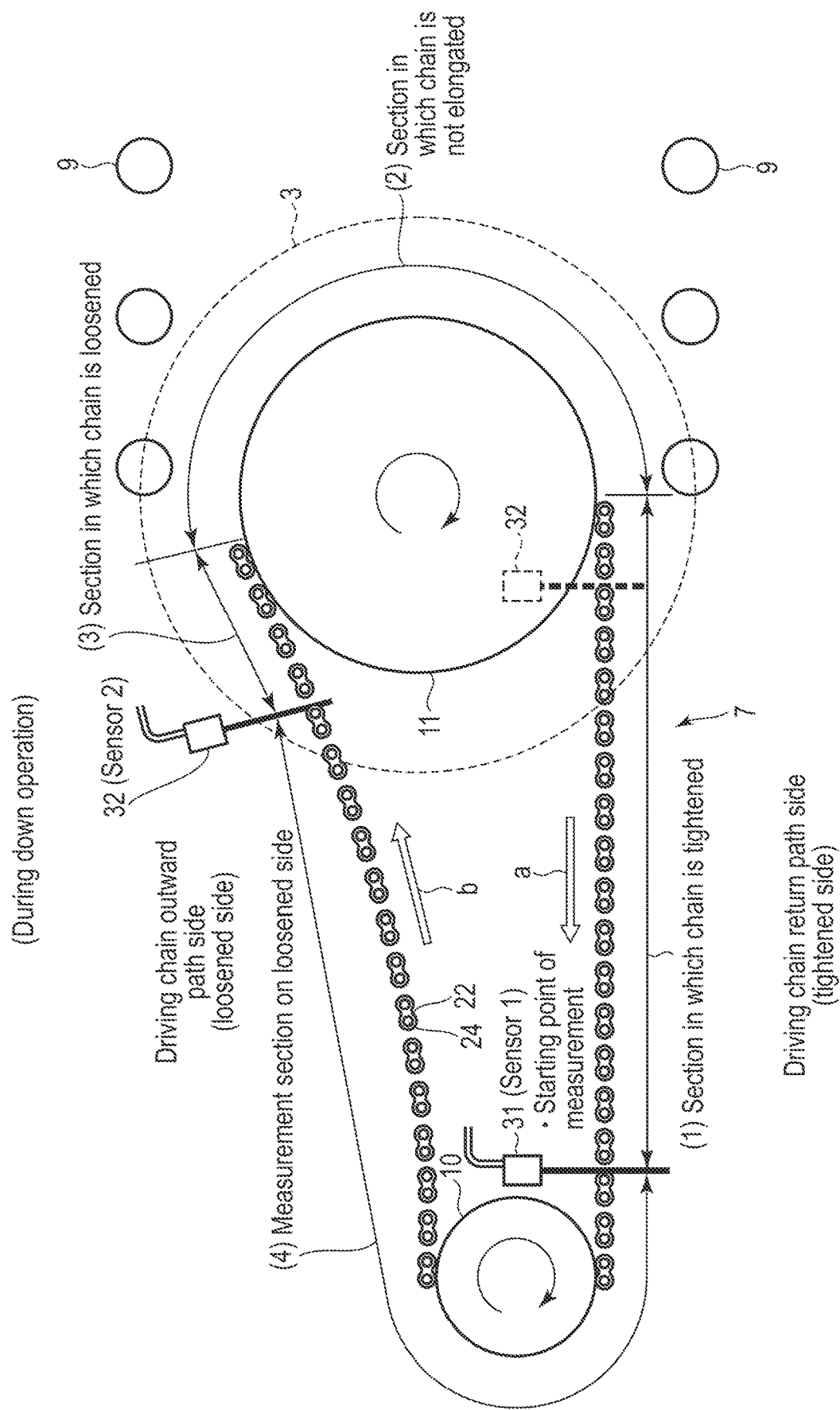
FIG. 23 is an illustration of a method for measuring the elongation of a chain in the sixth embodiment, showing a state of the driving chain during down operation.

FIG. 22 is an illustration of a method of measuring the elongation of a chain in the sixth embodiment, showing a state of the driving chain during the up operation. FIG. 23 shows a state of the driving chain during the down operation.

The sensor arrangement in the sixth embodiment is similar to that in the first embodiment (FIGS. 6 and 7). That is, the sensor 31 is placed close to the driving sprocket 10 on the return path side of the moving path of the driving chain 7. The sensor 32 is placed close to the driven sprocket 11 on the outward path side of the moving path of the driving chain 7.

In the sixth embodiment, two sensors 31 and 32 are used to measure (a) the elongation of a chain that is tightened and (b) the elongation of a chain that is loosened.

(During Up Operation)

As shown in FIG. 22, during the up operation, the outward path side of the driving chain 7 (the upper chain) is tightened and the return path side (the lower chain) is loosened. The sensors 31 and 32 are connected to the diagnostic device 33 shown in FIG. 3A.

(a) Measurement of Elongation of Tightened Chain

The measurement of the elongation of a chain that is tightened is similar to the measurement in the up operation of the first embodiment described above.

That is, the elongation detection unit 33a of the diagnostic device 33 detects an elongation amount of the driving chain 7 in a measurement section from the sensor 31 to the sensor 32 with the sensor 31 as a starting point of measurement. More specifically, as the chain 21 moves, the elongation detection unit 33a determines a time difference between the rise timing of the detection signal S1 output from the sensor 31 and the rise timing of the detection signal S2 output from the sensor 32 and detects an elongation amount of the chain 21 based on the time difference.

The measurement section in the above case includes a number of sections (1) in which the driving chain 7 is tightened. Thus, the elongation of the driving chain 7 that is tightened can accurately be measured.

(b) Measurement of Elongation of Loosened Chain

The elongation detection unit 33a changes the starting point of measurement to the sensor 32, and detects an elongation amount of the driving chain 7 in a measurement section from the sensor 32 to the sensor 31. Specifically, as the chain 21 moves, the elongation detection unit 33a determines a time difference between the rise timing of the detection signal S2 output from the sensor 32 and the rise timing of the detection signal S1 output from the sensor 31 and detects an elongation amount of the chain 21 based on the time difference.

The measurement section in the above case includes a section (4) in which the driving chain 7 is loosened on the return path side as shown in FIG. 22. That is, if the sensor 32 is used as the starting point of measurement, the chain elongation in the measurement section on the loosened side can be measured using the sensors 32 and 31.

The subsequent operation is similar to that in the fifth embodiment. If the accurate measured value X obtained from the measurement on the loosened side and the measured value Y obtained from the measurement on the loosened side are compared with each other, an amount of looseness can be obtained from an error between them. In this case, the greater the error between the measured value X and the measured value Y, the greater the amount of looseness. The abnormality determination unit 33b shown in FIG. 3A determines an amount of looseness from the error between the measured values X and Y obtained by the elongation detection unit 33a, and warns the control device 14 when the amount of looseness is equal to or greater than a preset value.

(During Down Operation)

As shown in FIG. 23, during the down operation, the outward path side of the driving chain 7 (the upper chain) is loosened and the return path side (the lower chain) is tightened. The sensors 31 and 32 are connected to the diagnostic device 33 shown in FIG. 3A. Like during the up operation, the elongation detection unit 33a of the diagnostic device 33 uses the sensors 31 and 32 to measure (a) the elongation of a chain that is tightened and (b) the elongation of a chain that is loosened.

(a) Measurement of Elongation of Tightened Chain

The measurement of the elongation of a chain that is tightened is similar to the measurement during the down operation of the first embodiment described above. The elongation detection unit 33a of the diagnostic device 33 detects an elongation amount of the driving chain 7 in a measurement section from the sensor 31 to the sensor 32 with the sensor 31 as a starting point of measurement. The elongation amount in this case is an amount of elongation of a chain that is tightened, and is an accurate value (measured value X).

(b) Measurement of Elongation of Loosened Chain

The elongation detection unit 33a changes the starting point of measurement to the sensor 32, and detects an elongation amount of the driving chain 7 in a measurement section from the sensor 32 to the sensor 31.

The measurement section in the above case includes a section (4) in which the driving chain 7 is loosened on the outward path side as shown in FIG. 23. That is, if the sensor 32 is used as the starting point of measurement, the chain elongation in the measurement section on the loosened side can be measured using the sensors 32 and 31 (measured value Y).

If the measured values X and Y are compared in the same manner as during the up operation, an amount of looseness can be obtained from an error between them. The abnormality determination unit 33b shown in FIG. 3A warns the control device 14 when the amount of looseness is equal to or larger than a preset value.

According to the sixth embodiment described above, two sensors are used to measure the elongation of a chain that is tightened and the elongation of the chain that is loosened, with the result that an amount of looseness as well as an amount of elongation can be detected. In this case, too, the looseness of the chain as well as the elongation of the chain can be measured with high accuracy during both the up and down operations.

The sixth embodiment has been described, taking the sensor arrangement of the first embodiment as an example. The same applies to the sensor arrangement of the second embodiment. That is, in the sensor arrangement shown in FIGS. 10 and 11, the starting point of measurement is changed to the sensor 31 or the sensor 32 to measure the elongation of a chain that is tightened and the elongation of a chain that is loosened, with the result that the amount of looseness as well as the amount of elongation can be detected.

The foregoing embodiments have been described, taking the driving chain 7 as an example. The embodiments can also be applied to the handrail chain 16 and the step chain 9.

The embodiments are also applicable not only to escalators but also to all passenger conveyors including moving walkways and the like. Furthermore, the embodiments can be applied not only to persons but also to the entire conveyor devices that convey persons and objects by driving a chain, from which the same advantages as those of the foregoing embodiments can be obtained.

At least one of the embodiments described above makes it unnecessary to provide a plurality of sensors individually for the up and down operations and provides a diagnostic system capable of measuring the elongation of a chain with high accuracy during both the up and down operations using a sensor provided in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A diagnostic system comprising:
   a conveyor device including an endless chain having a plurality of rollers coupled at regular pitches and each fit into a bush, to circularly move between a first sprocket and a second sprocket;
   first and second sensors diagonally disposed apart from each other on a moving path of the chain, irrespective of an operating direction of the conveyor device, to detect a passage of each of the rollers of the chain; and
   a diagnostic device configured to measure an amount of elongation of the chain based on a first detection signal output from the first sensor and a second detection signal output from the second sensor according to movement of the chain during operation of the conveyor device,
   wherein:
   the first sensor is disposed close to the first sprocket on one side of the moving path of the chain,
   the second sensor is disposed close to the second sprocket on another side of the moving path of the chain, and
   the diagnostic device is configured to
      according to the operating direction of the conveyor device, when the first sensor is disposed in the loosened side, measure the amount of elongation of the chain in a section from the first sensor to the first sprocket, a section in which the chain is engaged with the first sprocket and a section from the first sprocket to the second sensor, and according to the operation direction of the conveyor device, when the first sensor is disposed in the tightened side, measure the amount of elongation of the chain in a section from the first sensor to the second sprocket, a section in which the chain is engaged with the second sprocket and a section from the second sprocket to the second sensor.

2. The diagnostic system of claim 1, wherein the diagnostic device measures the amount of elongation of the chain in a section from the first sensor to the second sensor on the moving path of the chain with the first sensor as a starting point of measurement.

3. The diagnostic system of claim 1, wherein:
the first sensor is disposed close to the first sprocket on a return path side of the moving path of the chain; and
the second sensor is disposed close to the second sprocket on an outward path side of the moving path of the chain.

4. The diagnostic system of claim 3, wherein:
the conveyor device has a function of rotating the first sprocket to perform a first-direction operation of moving the outward path side of the chain from the second sprocket to the first sprocket and a second-direction operation of moving the outward path side of the chain from the first sprocket to the second sprocket; and
the first and second sensors are arranged such that the conveyor device is effectively used when the conveyor device performs the second-direction operation.

5. The diagnostic system of claim 1, wherein:
the first sensor is disposed close to the first sprocket on an outward path side of the moving path of the chain; and
the second sensor is disposed close to the second sprocket on a return path side of the moving path of the chain.

6. The diagnostic system of claim 5, wherein:
the conveyor device has a function of rotating the first sprocket to perform a first-direction operation of moving the outward path side of the chain from the second sprocket to the first sprocket and a second-direction operation of moving the outward path side of the chain from the first sprocket to the second sprocket; and the first and second sensors are arranged such that the conveyor device is effectively used when the conveyor device mainly performs the first-direction operation.

7. The diagnostic system of claim 1, further comprising a third sensor disposed on the moving path of the chain and spaced from and opposed to the first sensor or the second sensor to detect a passage of each of the rollers of the chain,
wherein the diagnostic device selectively uses two of the first, second and third sensors in accordance with the operating direction of the conveyor device to measure an amount of elongation of a section of the chain which is tightened.

8. The diagnostic system of claim 7, wherein the diagnostic device selectively uses two of the first, second and third sensors in accordance with the operating direction of the conveyor device to measure an amount of elongation of the chain that is tightened and an amount of elongation of the chain that is loosened.

9. The diagnostic system of claim 8, wherein the diagnostic device measures an amount of looseness of the chain based on an error between the amount of elongation of the chain that is tightened and the amount of elongation of the chain that is loosened.

10. The diagnostic system of claim 1, wherein the diagnostic device changes a starting point of measurement to the first sensor or the second sensor in accordance with the operating direction of the conveyor device to measure an amount of elongation of the chain that is tightened and an amount of elongation of the chain that is loosened.

11. The diagnostic system of claim 10, wherein the diagnostic device measures an amount of looseness of the chain based on an error between the amount of elongation of the chain that is tightened and an amount of elongation of the chain that is loosened.

* * * * *